(12) United States Patent
Gorokhov

(10) Patent No.: US 8,208,495 B2
(45) Date of Patent: Jun. 26, 2012

(54) DATA TRANSMISSION WITH SUPPLEMENTAL RESOURCES

(75) Inventor: Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 808 days.

(21) Appl. No.: 11/782,852

(22) Filed: Jul. 25, 2007

(65) Prior Publication Data

US 2008/0025338 A1 Jan. 31, 2008

Related U.S. Application Data

(60) Provisional application No. 60/833,627, filed on Jul. 26, 2006, provisional application No. 60/834,126, filed on Jul. 27, 2006.

(51) Int. Cl.
*H04J 1/14* (2006.01)
(52) U.S. Cl. .......................... 370/496; 370/373; 370/419
(58) Field of Classification Search .................. 370/419, 370/496, 369, 373; 455/103
See application file for complete search history.

(56) References Cited

U.S. PATENT DOCUMENTS

| | | | | |
|---|---|---|---|---|
| 5,577,038 | A * | 11/1996 | Miyahara | 370/352 |
| 6,427,007 | B1 * | 7/2002 | Burg et al. | 379/201.01 |
| 6,604,216 | B1 | 8/2003 | Javerbring et al. | |
| 6,693,910 | B2 * | 2/2004 | Chao | 370/394 |
| 6,754,206 | B1 * | 6/2004 | Nattkemper et al. | 370/369 |
| 6,947,413 | B2 * | 9/2005 | Wakabayashi et al. | 370/358 |
| 2001/0008520 | A1 * | 7/2001 | Tiedemann et al. | 370/328 |
| 2002/0102987 | A1 * | 8/2002 | Souisse et al. | 455/454 |
| 2003/0026238 | A1 * | 2/2003 | Baills et al. | 370/347 |
| 2004/0038691 | A1 * | 2/2004 | Shin | 455/466 |
| 2006/0153110 | A1 * | 7/2006 | Morgan et al. | 370/310 |
| 2007/0217448 | A1 * | 9/2007 | Luo et al. | 370/468 |
| 2008/0025338 | A1 * | 1/2008 | Gorokhov | 370/441 |

FOREIGN PATENT DOCUMENTS

| | | |
|---|---|---|
| CN | 1538655 A | 10/2004 |
| JP | 2000244518 | 9/2000 |
| JP | 2004297193 A | 10/2004 |
| JP | 2010500789 A | 1/2010 |
| RU | 2187207 C2 | 8/2002 |
| RU | 2003119173 | 12/2004 |
| RU | 2258314 C2 | 8/2005 |
| WO | WO9843430 A1 | 10/1998 |
| WO | WO0241509 | 5/2002 |

(Continued)

OTHER PUBLICATIONS

LG Electronics, "Forward Packet Data Control Assignment Channel," 3GPP2 TSG-C WG3, Jul. 31, 2006, XP002466303, pp. 8-9.

(Continued)

*Primary Examiner* — Robert Wilson
(74) *Attorney, Agent, or Firm* — Donald C. Kordich

(57) ABSTRACT

Communication systems and methods that minimize repetition of data packets in the presence of supplemental resources are disclosed. Control channels not engaged in transmission of control messages are dynamically allocated to carry traffic data. The data packets that comprise the traffic data are processed in accordance with various schemes and the generated subpackets are transmitted so that an entire subpacket is transmitted on the traffic channel while a corresponding coded portion of the last subpacket is transmitted on the available supplemental channels. If the subpacket is decoded correctly an acknowledgement (ACK) message is sent otherwise a negative acknowledgement (NAK) is transmitted.

20 Claims, 17 Drawing Sheets

FOREIGN PATENT DOCUMENTS

| | | |
|---|---|---|
| WO | WO0245311 A1 | 6/2002 |
| WO | WO03039056 A1 | 5/2003 |
| WO | 2006002658 | 1/2006 |

OTHER PUBLICATIONS

Soong et al., "Forward High-Speed Wireless Packet Data Service in IS-2000—1XEV-DV," IEEE Communications Magazine, Aug. 2003, pp. 170-177, vol. 41, No. 8, XP001177716, IEEE Service Center, New York, NY, US.

Xu et al., "Adaptive Incremental Redundancy Scheme on High-Speed Wireless Communication System," Personal, Indoor and Mobile Radio Communications, 2003, 14TH IEEE Proceedings on Sep. 7-10, 2003, pp. 294-296, vol. 1, XP010681604, IEEE, Piscataway, NJ, USA.

International Search Report, PCT/US07/074451, International Search Authority, European Patent Office, Feb. 11, 2008.

Written Opinion, PCT/US07/074451, International Search Authority, European Patent Office, Feb. 11, 2008.

\* cited by examiner

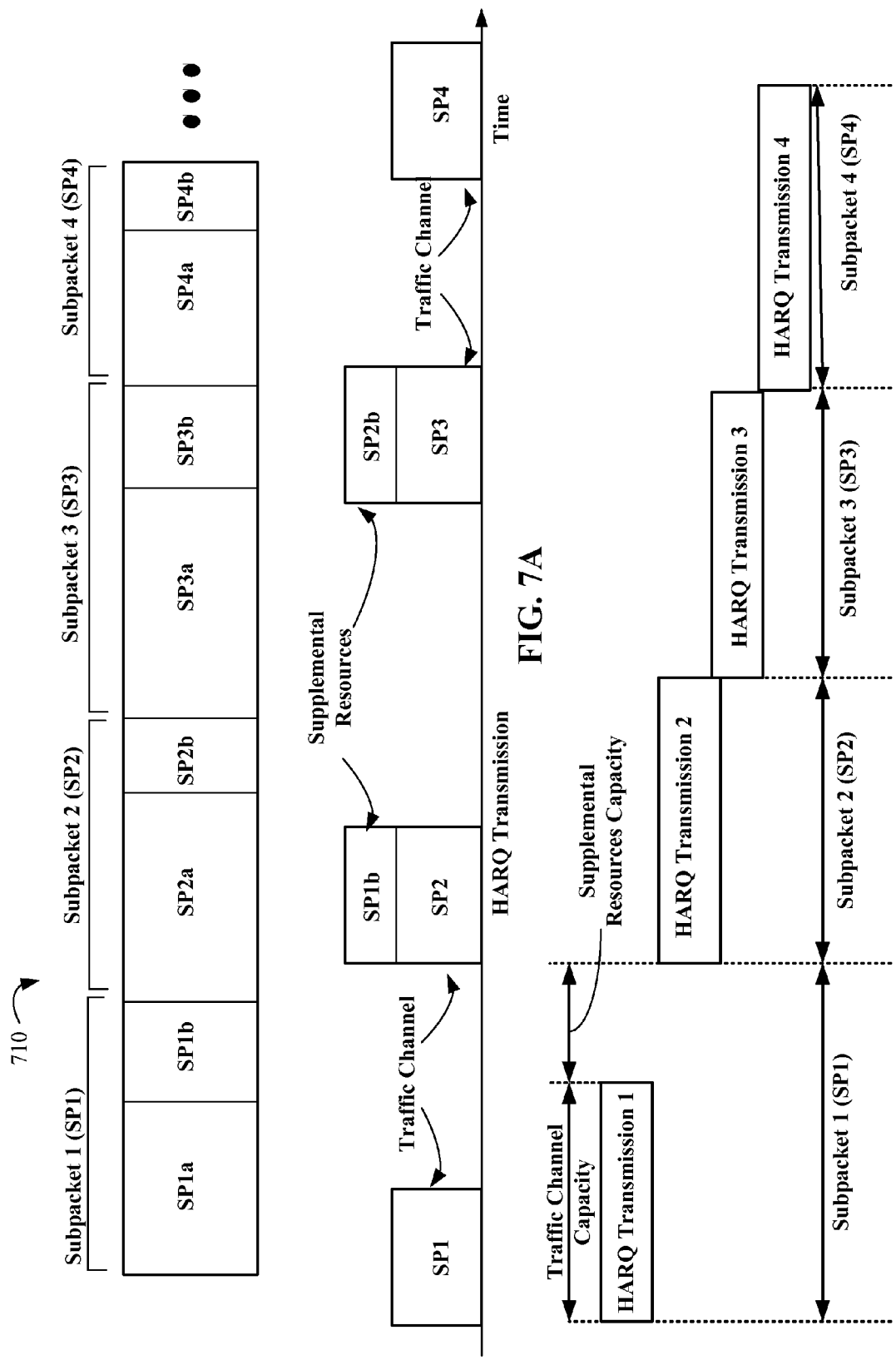

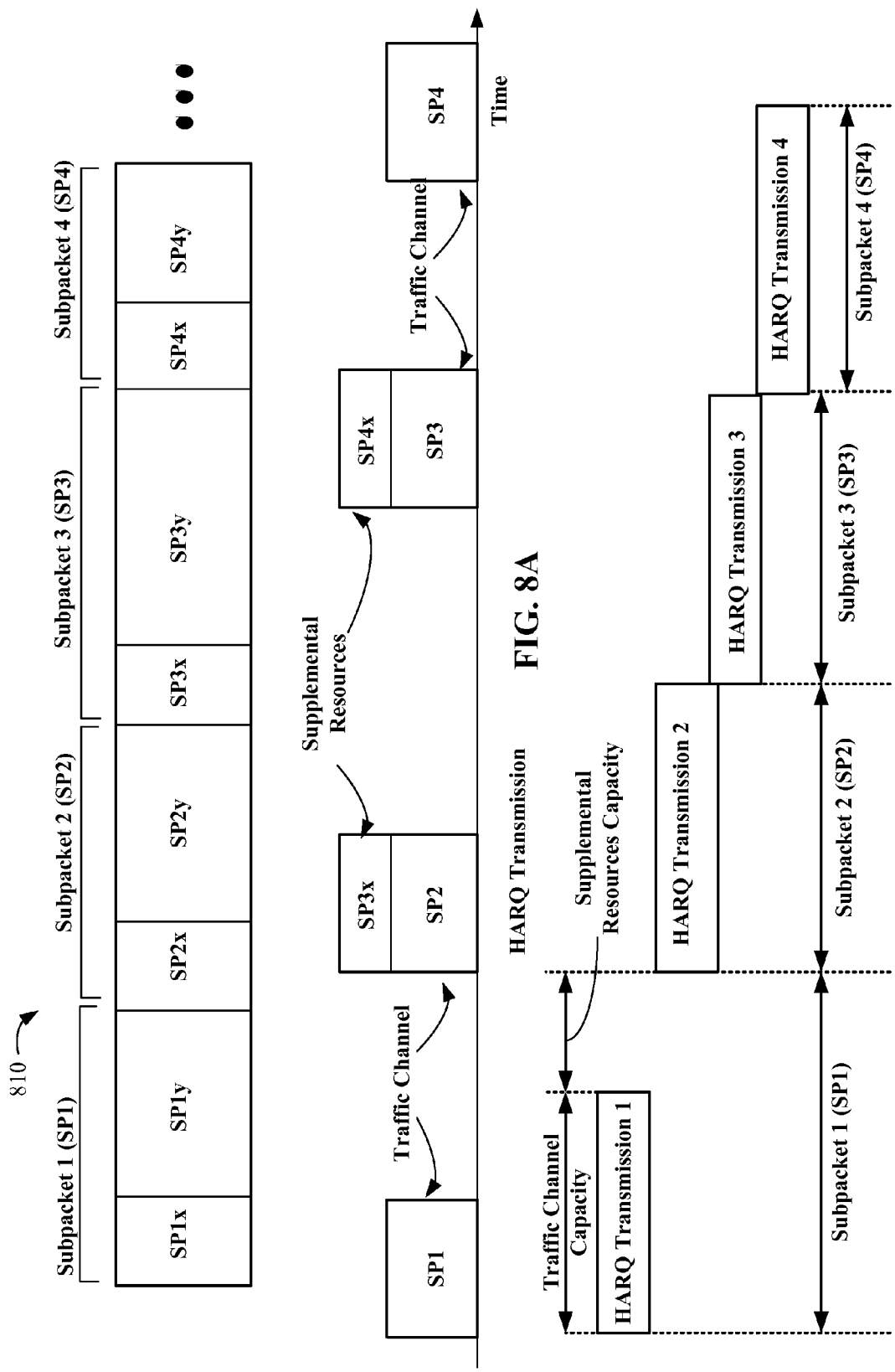

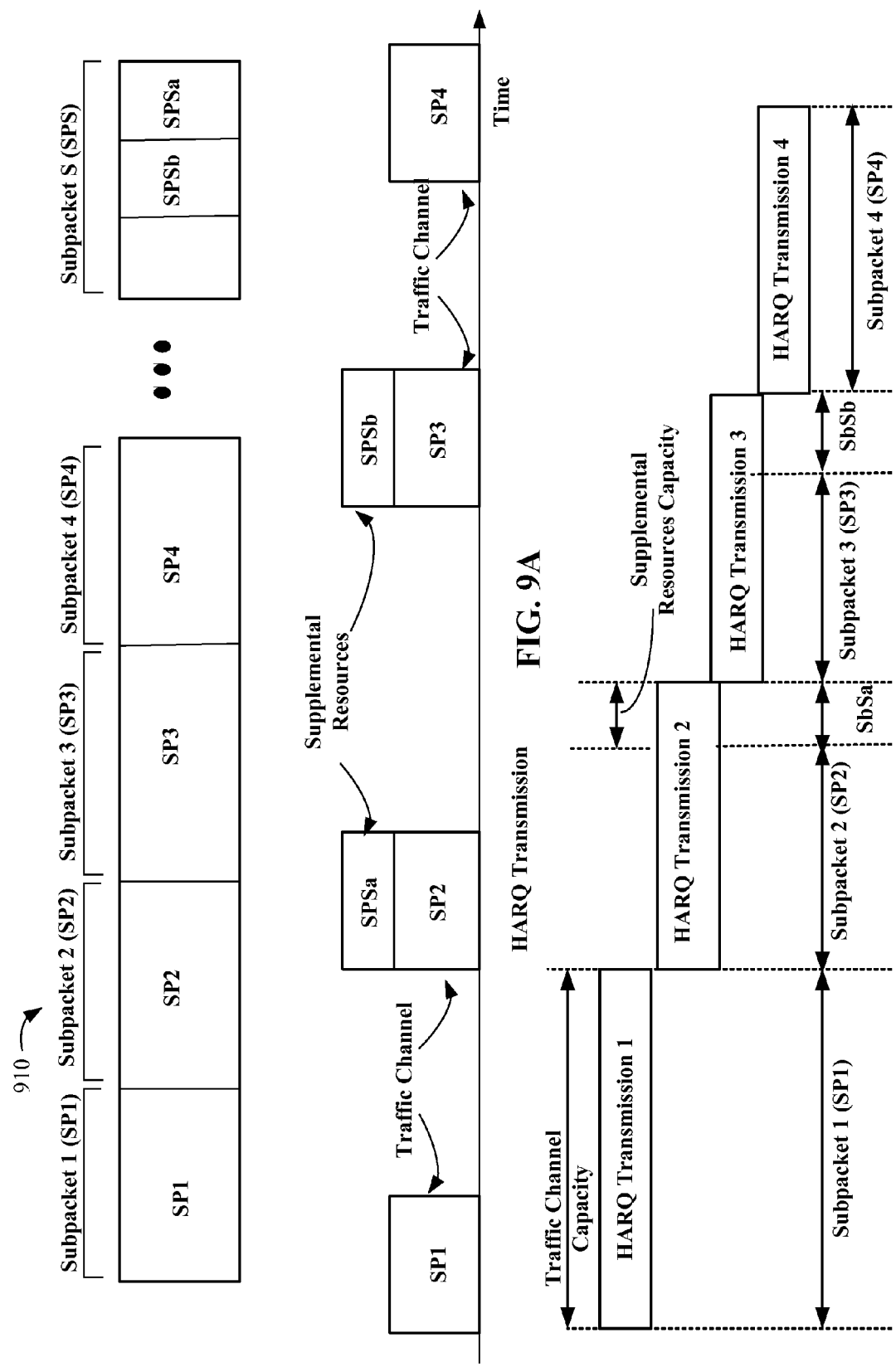

DATA TRANSMISSION WITH SUPPLEMENTAL RESOURCES

CROSS-REFERENCE TO RELATED APPLICATION(S)

This application claims the benefit of U.S. Provisional Patent Application Ser. No. 60/833,627 filed on Jul. 26, 2006 and entitled "DATA TRANSMISSION WITH SUPPLEMENTAL RESOURCES", and U.S. Provisional Patent Application Ser. No. 60/834,126 filed on Jul. 27, 2006 and entitled "DATA TRANSMISSION WITH SUPPLEMENTAL RESOURCE", the entirety of which is incorporated herein by reference.

BACKGROUND OF THE INVENTION

The advent of various communication systems and increasing deployment of sophisticated applications in mobile end systems, has stressed existing resources like frequencies available to facilitate these communications. Different multiple access technologies have been proposed to support the increasing traffic within communication networks. Frequency Division Multiple Access (FDMA) is one such technology that allows communications by assigning and reusing frequencies between different users. Another example of multiple access technology is Code Division Multiple Access (CDMA) which employs spread spectrum technique to simultaneously accommodate different users on a broad spectrum.

Accordingly, CDMA systems are characterized by bursty communications wherein the communication channels are populated during data transmission but remain silent at other times. This is rectified by a flexible use of channels wherein channels are assigned for different tasks based on necessity. Thus, channels are connected for a user only during data transmissions, reassigned for other tasks during the period when there is no data transmitted and are reconnected again upon data transmission.

Channels in a communication system may be divided into physical and logical channels wherein physical channels are the frequencies carrying communications and logical channels are schematic partitions created on these frequencies based on the tasks to be performed. A single physical channel may hence be divided into one or more logical channels. In other words, logical channels are different names assigned to the physical frequencies based on the tasks involved.

Physical channels are normally further divided into dedicated channels and common channels depending on the entities being serviced. A dedicated channel is assigned to facilitating communications between a base station and a specific user. A common channel is shared by different users and is used by a base station to transmit signals that are commonly communicated to all users within the geographic area (cell) being serviced by the base station. Examples of dedicated channels include fundamental channel (FCH), a dedicated control channel (DCCH), as well as a supplemental channel (SCH). The FCH can transmit a voice signal, a data signal, and a signaling signal or a control signal. The DCCH transmits data signals as well as control signals, in a discontinuous transmission mode wherein data transmission occurs only if transmission data is generated from a higher layer, which makes the DCCH suitable as a control channel for providing packet service efficiently. The SCH is a channel that is optionally used when large amount of data needs to be transmitted. Examples of common channels on a base station-to-mobile forward/down link include paging channel, broadcast channel, and forward common control channel to name a few. An access channel, an enhanced access channel, and a reverse common control channel are some of the common channels on the reverse link.

Logical channels established on the dedicated physical channels include a dedicated signaling channel (DSCH) and a dedicated traffic channel (DTCH). The DSCH can be assigned on the FCH and the DCCH to exchange control signals between a base station and a mobile station, whereas the DTCH can be established on the FCH, DCCH, and SCH to exchange user data. Common logical channels assigned on the common physical channels include a common assignment channel used by a base station to acknowledge a user/mobile terminal, a common control channel (CSCH) for transmitting a control signal and a common traffic channel (CTCH) for transmitting user data. The common logical channels can be established on the forward link as well as the reverse link.

When data is generated for transmission by a user, a service request is transmitted via established communication channels and based on the negotiated service options/availability resources are assigned to the user. Accordingly, various control and data resources are assigned on common/dedicated channels. For example, supplemental resources may be assigned subject to availability if it is anticipated that large amount of data will be transmitted and if the service options associated with the user permit assignment of such supplemental resources. A resource assignment message detailing the various resources including information regarding supplemental resources allotted is communicated by the base station to the user upon allocation of the resources. Hence, when the user communicates data, the data is demodulated based on the resources assigned.

Due to various reasons such as limited range and deleterious effects such as Doppler shift in moving terminals, the resource assignment message from the base station may be erased. This leads to a situation where the user is unable to demodulate messages since it is not know what, if any, resources have been assigned for that particular communication session. For example, if the service options permit allocation of supplemental resources, erasure of the resource assignment message will prevent the user from knowing if any supplemental resources have been assigned. Additionally, availability of supplemental resources can lead to non-optimal repetition of coded bits.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

A communication system in accordance with various aspects described herein provides for allocating supplemental resources for transmitting traffic data. A control channel within the communication system comprises Link Assignment Blocks (LABs) that are mapped to channel nodes reserved for control channel. If any of the LABs are not engaged in transporting control signals the channel nodes associated with such LABs are used as supplemental resources for transmitting traffic data. A processor processes a data packet of the traffic data into S subpackets of coded data. When a first subpacket is transported by a base station to a terminal on forward link, the terminal generates an acknowledgement (ACK) if the subpacket is decoded correctly or a negative acknowledgement (NAK) if the subpacket is decoded in error. Upon receiving the ACK or NAK message, the base station transmits a second subpacket. The terminal receives the second transmission, decodes the first and second subpackets, and sends an ACK or NAK based on the decoding result. The base station thus transmits one subpacket at a time until an ACK is received for the packet, or all subpackets have been transmitted, or the packet transmission is terminated.

Another aspect relates to a communication system that facilitates transmission of data packets in a manner that minimizes repetition of coded bits. The system comprises a processor that generates subpackets from a data packet which comprises P information bits encoded into Q coded bits at a code rate of P/Q. The system also comprises a buffer from which the generated subpackets are filled by taking the Q coded bits in a circular fashion. The subpackets are transmitted by the communication system such that an entire subpacket is transmitted on the traffic channel while a corresponding coded portion of the last subpacket is transmitted on available supplemental resources thereby minimizing repetition of coded bits caused by the presence of the supplemental resources within the communication system.

In accordance with another aspect, a transmission methodology is disclosed which comprises indicating to a base station whether a transmitted data subpacket was decoded correctly. The method begins with the traffic data being processed into subpackets of coded data. A first subpacket is transmitted on the forward link. Upon reception at a terminal, the first subpacket is decoded. If the subpacket is decoded correctly an acknowledgement (ACK) is generated. If the subpacket is decoded incorrectly, a negative acknowledgement (NAK) is generated. The subpackets are thus transmitted until at least one of an ACK message is received for the packet, or all the subpackets are used or the packet transmission is terminated.

In yet another aspect, a methodology of transmission of data packets is disclosed. The method comprises generating subpackets from a data packet that comprises P information bits encoded into Q coded bits at a code rate of P/Q. The generated subpackets are then filled with the Q coded bits in a circular manner such that upon filling the Qth bit the first bit is filled again. Subsequently, all the subpackets are transmitted so that an entire subpacket is transmitted on the traffic channel while a coded portion of the last subpacket is transmitted on available supplemental resources.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 7A shows an embodiment of an HARQ transmission scheme implemented with dynamically assignable supplemental resources.

FIG. 7B shows a schematic diagram of four HARQ transmissions in accordance with an aspect.

FIG. 8A shows an embodiment of a HARQ transmission scheme implemented with dynamically assignable supplemental resources.

FIG. 8B shows a schematic diagram of four HARQ transmissions in accordance with an aspect.

FIG. 9A also shows the first four HARQ transmissions for an exemplary scenario in accordance with an aspect.

FIG. 9B shows a schematic diagram of four HARQ transmissions in accordance with an aspect.

DESCRIPTION OF THE INVENTION

Figure 1:
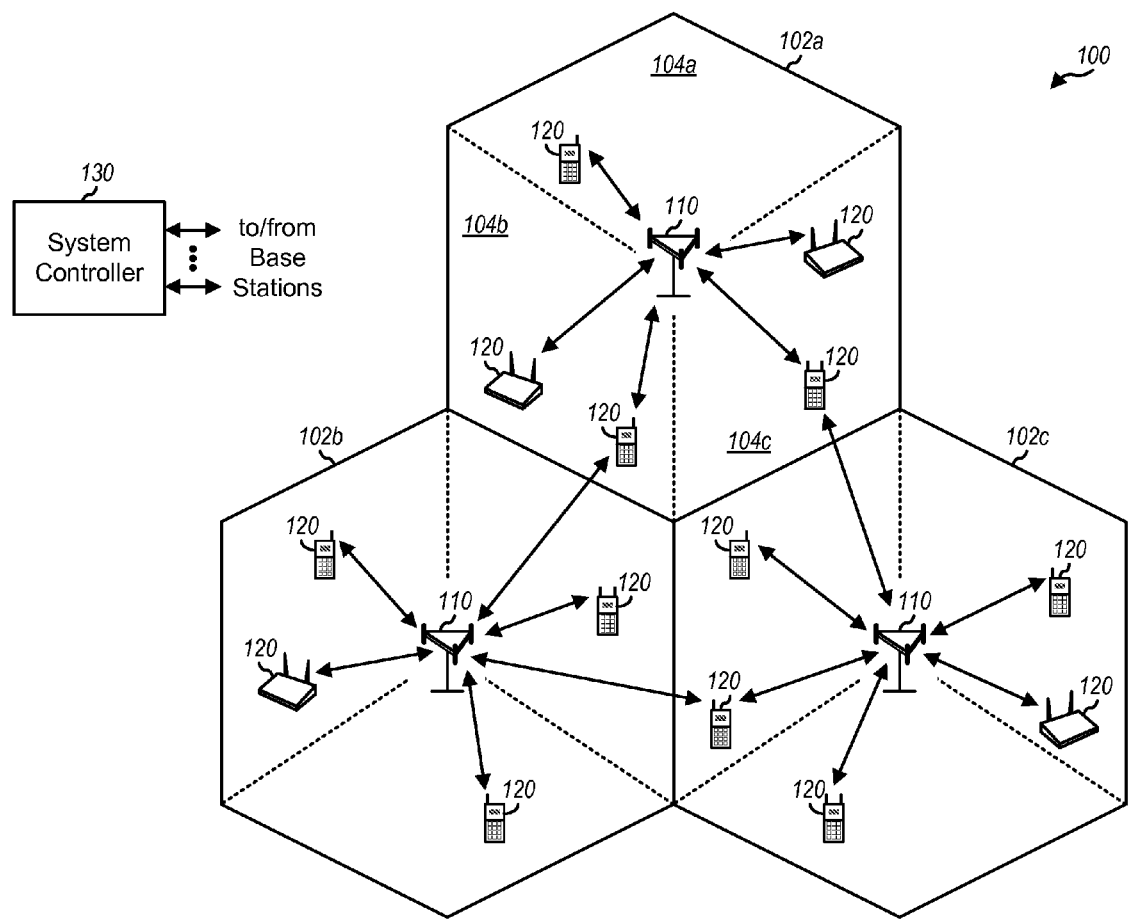
FIG. 1 illustrates a wireless multiple-access communication system in accordance with various aspects set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface. Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Each base station 110 and terminal 120 in system 100 may have one or more antennas to facilitate communication with one or more base stations 110 and/or terminals 120 in system 100. In one example, a base station 110 can simultaneously transmit multiple data streams for broadcast, multicast, and/or unicast services, wherein a data stream is a stream of data that can be of independent reception interest to a terminal 120. A terminal 120 within the coverage area of a base station 110 can then receive one or more of the data streams transmitted from the base station 110. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed. In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, and so on. In one example, a terminal 120 can transmit data to a base station 110 or to another terminal 120.

In accordance with another aspect, system 100 can generate transmission resources in the form of channels. By way of non-limiting example, these channels can be generated via one or more of code division multiplexing (CDM), frequency division multiplexing (FDM), and time division multiplexing (TDM). Orthogonal frequency division multiplexing (OFDM), a variant of FDM, may be used to effectively partition the overall bandwidth of system 100 into multiple orthogonal subcarriers, which can then be modulated with data. These subcarriers may also be referred to as tones, bins, and frequency channels. Alternatively, in a time division based technique, each subcarrier can comprise a portion of sequential time slices or time slots. Each terminal 120 may be provided with one or more time slot/subcarrier combinations for transmitting and receiving information in a defined burst period or frame. A time division technique may also utilize a symbol rate hopping scheme and/or a block hopping scheme.

In another example, a code division based technique can facilitate the transmission of data over a number of frequencies available at any time in a range. Data can be digitized and spread over available bandwidth of system 100 such that multiple terminals 120 can be overlaid on the channel and respective terminals 120 can be assigned a unique sequence code. Terminals 120 can then transmit in the same wide-band chunk of spectrum, wherein a signal corresponding to each terminal 120 is spread over the entire bandwidth by its respective unique spreading code. In one example, this technique can provide for sharing, wherein one or more terminals 120 can concurrently transmit and receive. Such sharing can be achieved, for example, through spread spectrum digital modulation, wherein a stream of bits corresponding to a terminal 120 is encoded and spread across a very wide channel in a pseudo-random fashion. A base station 110 can then recognize the unique sequence code associated with a terminal 120 and undo the randomization in order to collect the bits for the particular terminal 120 in a coherent manner.

In another example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). Additionally, system 100 may utilize a combination of multiple-access schemes, such as OFDMA and CDMA. Additionally, system 100 may utilize various framing structures to indicate the manner in which data and signaling are sent on forward and reverse links. System 100 may further utilize one or more schedulers (not shown) to assign bandwidth and other system resources. In one example, a scheduler may be employed at one or more of a base station 110, a terminal 120, and a system controller 130.

Figure 2:
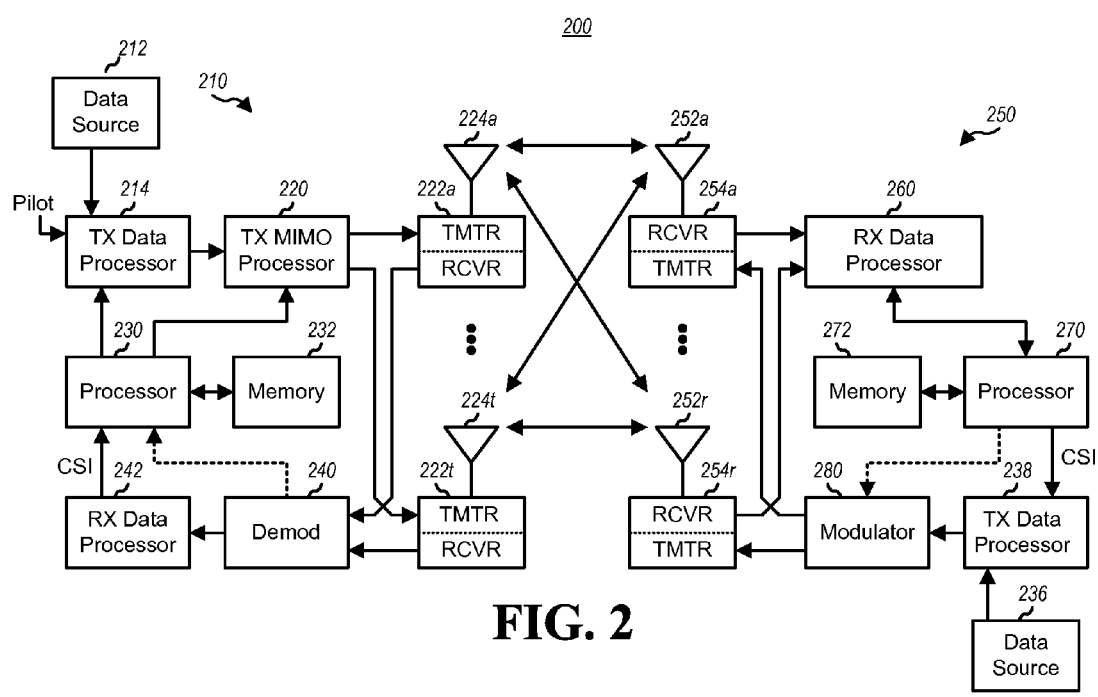
FIG. 2 is a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Data transmission techniques described herein may be used for various communication systems such as Code Division Multiple Access (CDMA) systems, Frequency Division Multiple Access (FDMA) systems, Time Division Multiple Access (TDMA) systems, Spatial Division Multiple Access (SCMA) systems, Orthogonal FDMA (O-FDMA) systems and Single-Carrier Frequency Division Multiplexing (SC-FDM) systems. An OFDMA system utilizes Orthogonal Frequency Division Multiplexing (O-FDM). An SC-FDMA system utilizes Single-Carrier Frequency Division Multiplexing (SC-FDM). OFDM and SC-FDM partition the system bandwidth tinto multiple (K) orthogonal subcarriers which are also referred to as tones, bins, and so on. Each subcarrier may be modulated with data. In general, modulation symbols ar sent in the frequency domain with OFDM and in the time domain with SC-FDM. For clarity, the techniques are described for an OFDMA system.

A system may define physical channels to facilitate allocation and use of the available system resources. A physical channel is a means for sending data at a physical layer. A physical channel used for sending traffic data (or user data) is referred to as a traffic channel. A physical channel used for sending control data (or signaling) is referred to as a control channel. The physical channels may be defined for any type of system resources such as subcarriers, time intervals, code sequences, and so on.

Figure 3:
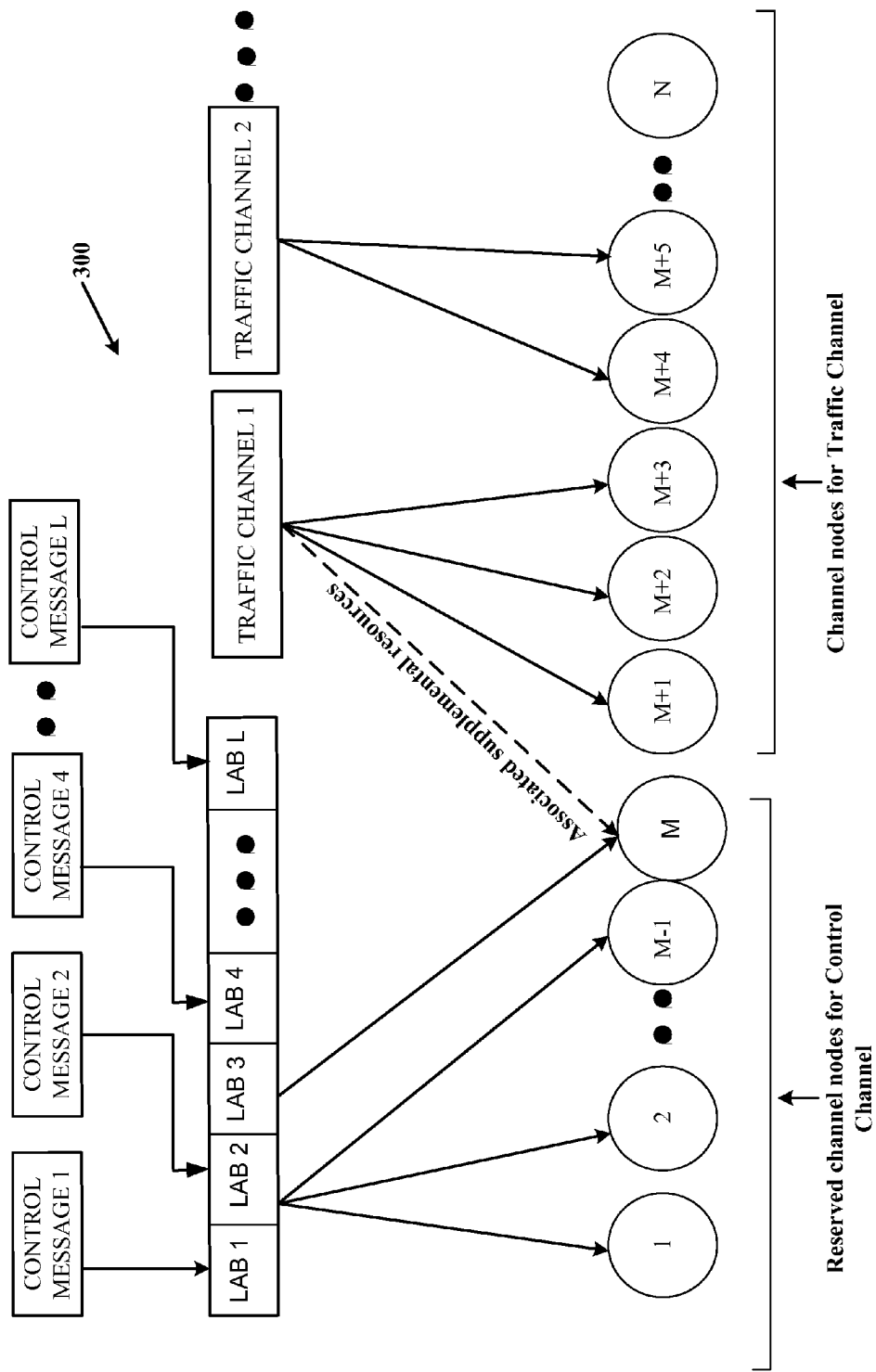
FIG. 3 shows an embodiment of a channel structure for the forward link or downlink.

FIG. 3 shows an embodiment of a channel structure 300 for the forward link or downlink. Channel structure 300 includes N channel nodes that are associated with different system resources, where N may be any integer value. For example, the N channel nodes may be mapped to N different tiles based on a mapping scheme. Each tile may cover a predetermined number of (e.g., 16) subcarriers in a predetermined number of (e.g., 8) symbol periods. The channel nodes may correspond to base nodes of a channel tree.

In the embodiment shown in FIG. 3, M channel nodes are reserved for a control channel, where in general $1 \leq M \leq N$. The control channel can be used to send control messages to the terminals. The control messages may include unicast messages sent to specific terminals and used to assign forward link and/or reverse link resources, to grant access, and so on. In an embodiment, each control message has a predetermined size (e.g., a specific number of information bits) and is processed with a specific coding and modulation scheme to generate a specific number of modulation symbols. In this embodiment, the different control messages have the same number of modulation symbols. M channel nodes may also be used for signaling channels such as, e.g., an acknowledgement channel (ACKCH), a power control channel (PCCH) and so on. The resources designated for these other signaling channels can be permanent and not utilized for other purposes.

The number of channel nodes (M) (and hence the amount of system resources) to reserve for the control channel is determined by the maximum number of control messages (L) that can be sent of the control channel in a give frame or time interval, the number of modulation symbols per control message, and the transmission capacity of each channel node. L can be selected such that (1) a scheduler can operate efficiently and is not constrained by signaling limitation and (2) overhead for the control channel is as low as possible. M may then be determined based on the selected L and the other parameters. L and M may be configurable (e.g., quasi-static) system parameters, and the configured values for these parameters may be signaled on a broadcast channel. In an exemplary embodiment, M is approximately 3 or 4, each channel node can carry approximately 40 modulation symbols, and the control channel is allocated approximately 120 to 160 modulation symbols. Up to L control messages can be sent on the control channel in a given frame with the M reserved channel nodes. In accordance with various aspects, control nodes are explicitly assigned to an AT through an assignment message similar to the manner in which resources are assigned to the AT.

FIG. 3 also shows an embodiment of the control channel 300. In this embodiment, the control channel comprises L link assignment blocks (LABs) that are mapped to the M reserved channel nodes based on a predetermined mapping scheme. The L LABs can be used to carry L control messages, one control message in each LAB.

The remaining N-M channel nodes can be used for traffic channels and/or other physical channels, e.g., broadcast channel, pilot channel, and so on. In the example show in FIG. 3, traffic channel 1 is allocated channel nodes M+1 through M+3, traffic channel 2 is allocated channel nodes M+4 and M+5, and so on. In general, each traffic channel can be allocated any number of channel nodes In an embodiment, one or more traffic channels are associated with the M reserved channel nodes for the control channel. In general, a given traffic channel may be associated with any number and any one of the reserved channel nodes. The M reserved channel nodes may also be associated with any number and any one of the traffic channels. The association between the traffic channels and reserved channel nodes may be quasi-static, e.g., determined whenever reserved channels nodes are configured for the control channel and/or whenever traffic channels are assigned to the terminals. In the example shown in FIG. 3 traffic channel 1 is associated with reserved channel node M. The remaining reserved channel nodes may be associated with other traffic channels (not shown in FIG. 3 for simplicity).

In another embodiment, one or more traffic channels are associated with the L LABs for the control channel. In general, traffic channels or system resources (e.g., channel nodes) for traffic channels may be associated with system resources for the control channel in various manners.

The reserved channel nodes or the LAB(s) associated with a traffic channel may be considered as supplemental resources that are assigned to carry traffic data on a tentative basis. If any portion of the associated reserved channel nodes(s) or if the associated LAB(s) are not used to send control messages, then the unused portion of the associated reserved channel nodes(s) or the unused LAB(S) can be used to send traffic data for the terminal assigned with that traffic channel. For example, in FIG. 3, reserved channel node M is associated with a link assignment block LAB 3 which is not utilized in carrying control messages. Accordingly, reserved channel node M can be allocated to carry traffic data.

Figure 4A:
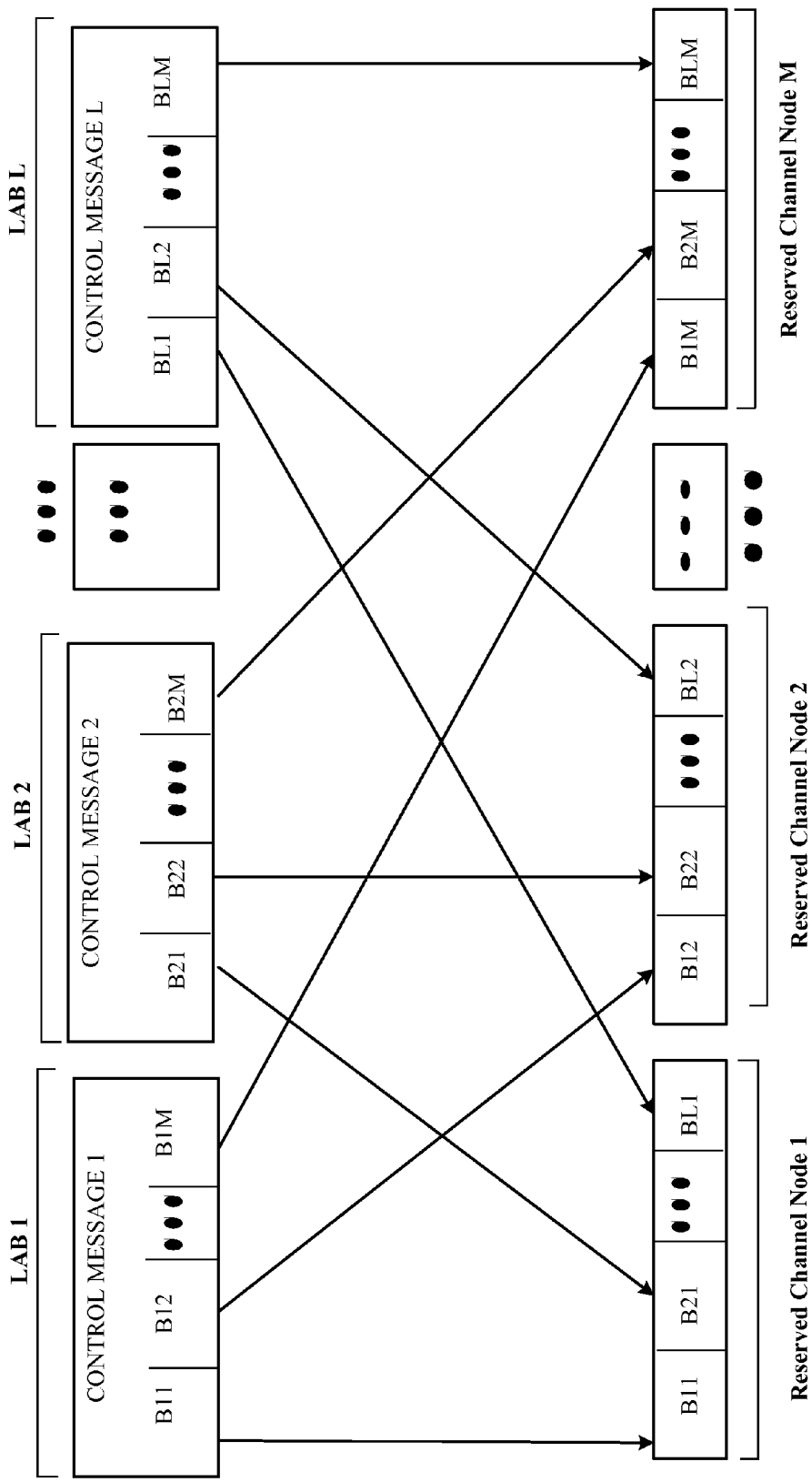
FIG. 4A shows an example of a mapping of LABs to reserved channel nodes in accordance with an aspect.

FIG. 4A shows an example of a mapping of LABs to reserved channel nodes. In another embodiment, each LAB is mapped one or multiple reserved channel nodes and each channel node can is used for only one LAB. In this embodiment, each reserved channel node can be entirely available to carry traffic data. However, the average number of LABs used in a give frame may be less than L. If a given LAB is not used in a given frame, then the portion of the M reserved channel nodes allocated for that LAB can be used to carry traffic data.

Figure 4B:
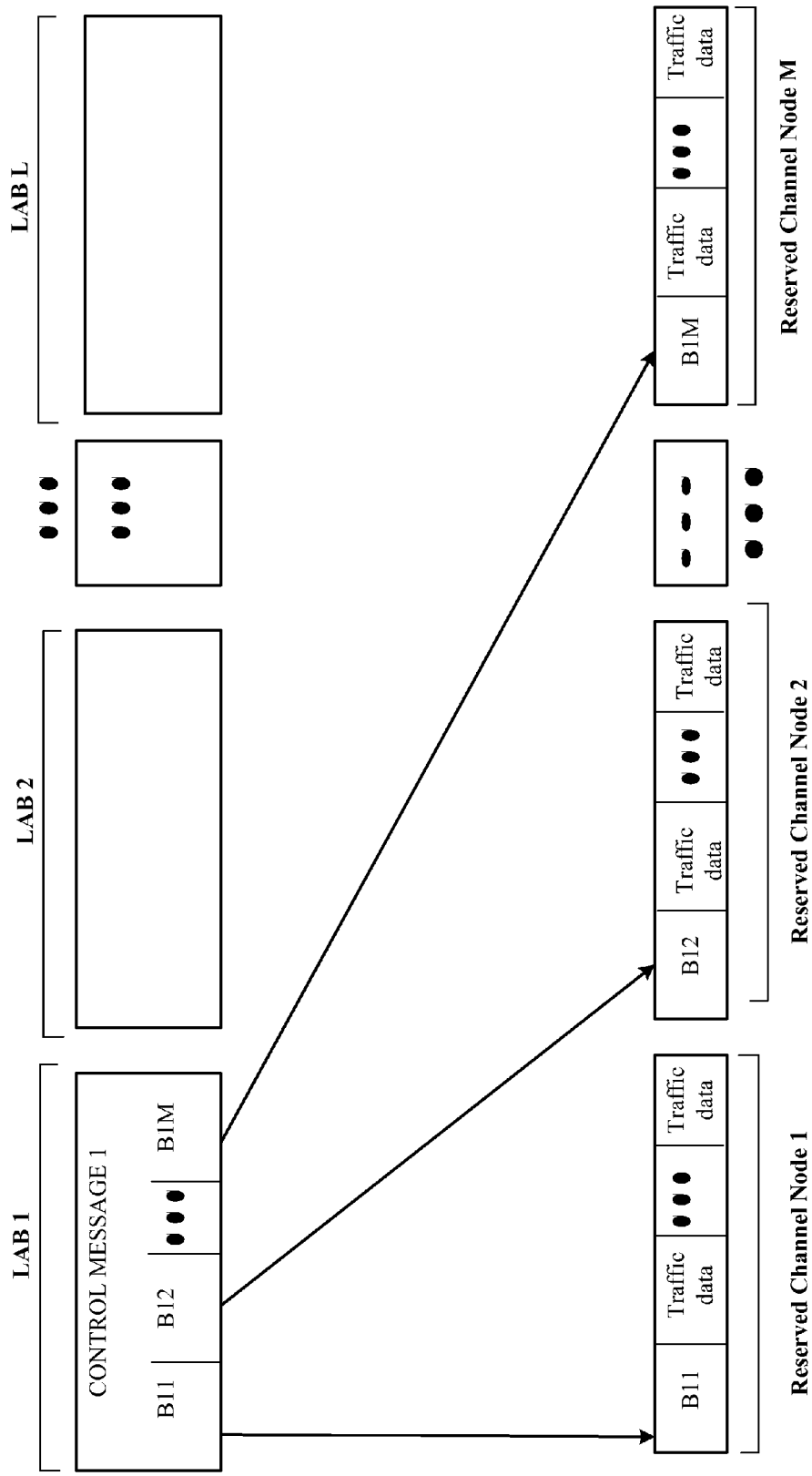
FIG. 4B shows an example in which only one control message is sent on LAB 1 in accordance with an aspect.

FIG. 4B shows an example in which only one control message is sent on LAB 1. In this example, parts B11 through B1M of the control message sent on LAB 1 are mapped to a portion of the reserved channel nodes 1 through M, respectively. Each reserved channel node has a portion that is not used to carry control messages and may thus be used to carry traffic data.

In the embodiments shown in FIGS. 4A and 4B, if some LABs are not used in a given frame, then each reserved channel node has a portion not used for control messages. The unused portion of each reserved channel node may be used to carry traffic data for the traffic channel associated with that reserved channel node. For example, if only half of the LABs are used in a give frame, then roughly half (or possibly less) of each reserved channel node is available to carry traffic data. The unused control channel resources are thus dynamically assigned to carry traffic data, on a per reserved channel node basis, rather than a per LAB basis.

FIGS. 4A and 4B show an embodiment of sending control messages on the control channel. The control messages may also be sent by other means.

Figure 5:
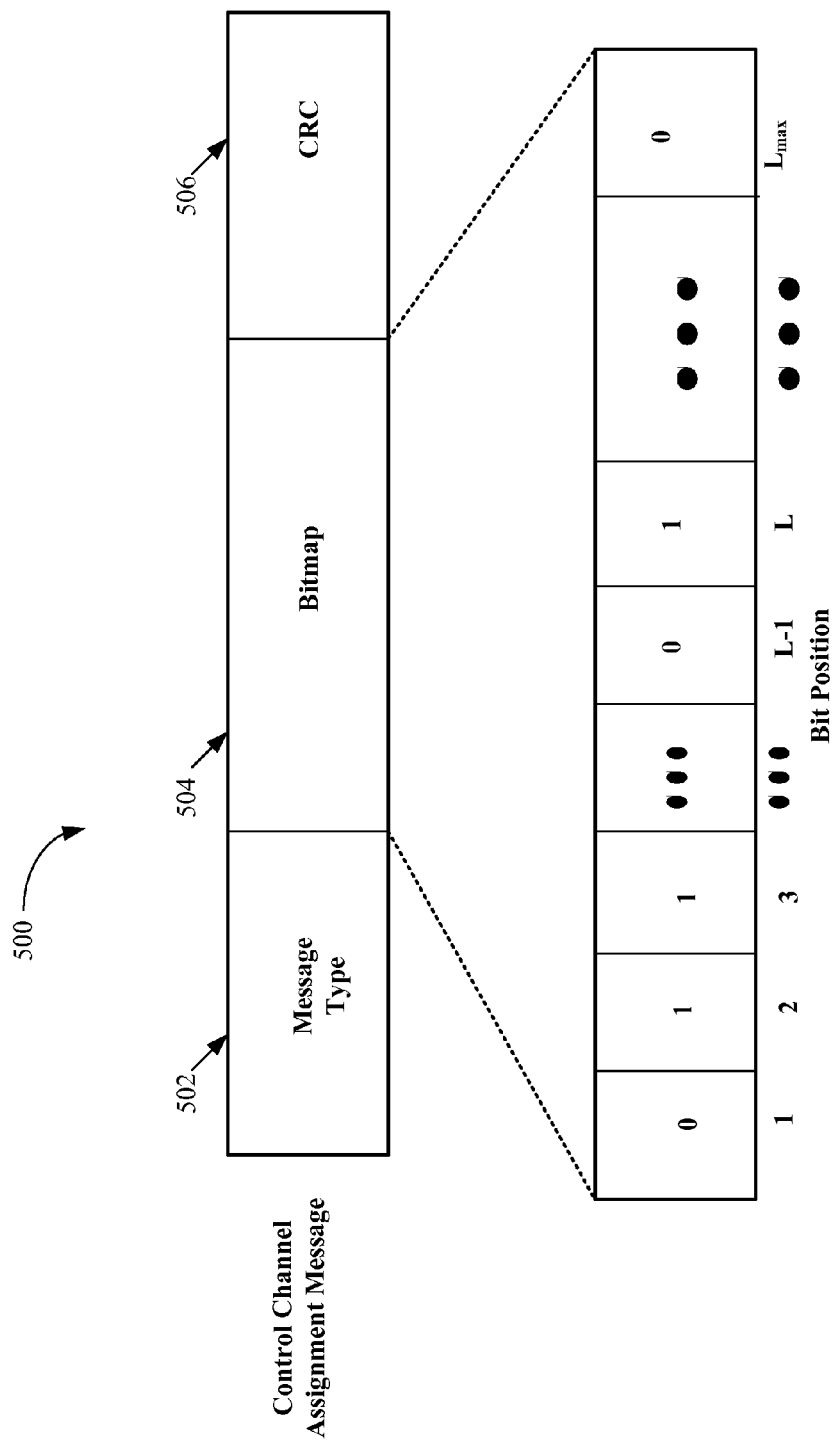
FIG. 5 shows an embodiment of a message format for a control channel assignment message used to convey the control messages being sent on the control channel.

FIG. 5 shows an embodiment of a message format for a control channel assignment message 500 used to convey the control messages being sent on the control channel. In this embodiment, assignment message 500 includes a message type field 502, a bitmap 504, and a cyclic redundancy check (CRC) field 506. The message type field 502 carries a specific value to identify this message as a control channel assignment message. Different messages may be assigned different message type values. The bitmap field carries a bit for each of the L LABs, e.g., the t-th bit of the bitmap can be associated with the t-th LAB. The bitmap field 504 can have a fixed size of $L_{max}$ bits, where $L_{max}$ is the maximum possible value for L.

Each bit of the bitmap indicates whether or not the associated LAB is used to send a control message. In the example shown in FIG. 5, control messages are sent on LABs 2, 3, ..., L and are not sent on LABs 1, 4, ..., L−1. The bitmap field may also have a configurable size that may be conveyed, e.g., by a bitmap size field of the assignment message (not shown in FIG. 3). The bitmap may also be sent in multiple messages, in which case each message includes an order ID to indicate which portion of the bitmap is conveyed in the message. The CRC field carries a CRC value used by the terminals to determine whether the assignment message is decoded correctly or in error. The information conveying which of the LABs are used or not used may also be sent in other manners with other message formats.

In an embodiment, assignment message 500 is sent on the control channel along with other control messages. For example, the assignment message may be sent on LAB 0 of the control channel. In an embodiment, the assignment message is scrambled with a pseudo-random number (PN) sequence that is a function of a sector identifier (ID), a broadcast MAC ID, and/or other parameters. The sector ID identifies the base station transmitting the message. The broadcast MAC ID (Media Access Control) indicates that the message is intended for all terminals. This embodiment allows the terminals to receive the assignment message and ascertain which LABs to process to recover control messages. The assignment message may also be sent on the broadcast channel and/or in other manners.

Assignment message 500 can be broadcast in each frame to convey which LABs are being used in that frame to carry control messages. Assignment message 500 also conveys which LABs are not used for control messages. The used LABs determine which portion of each reserved channel node is used for control data. The unused LABs determine which portion of each reserved channel node is unused for control data and thus can be used for traffic data. The terminals can ascertain the used and unused portions of each reserved channel node based on the assignment message 500. A base station may send traffic data on an assigned traffic channel 302 as well as the unused portion of each reserved channel node associated with that traffic channel 304.

Traffic data may be sent with or without hybrid automatic retransmission (HARQ). HARQ can be used to improve reliability of data transmission. For HARQ transmission on the forward link, a base station processes (e.g., format, encode, and interleave) a data packet to generate S subpackets of coded data, where S may be any integer value.

The base station transmits the first subpacket (SP1) on the forward link to a terminal. The terminal receives the transmission, decodes the subpacket SP1, and sends an acknowledgement (ACK) if the subpacket (SP1) is decoded correctly or a negative acknowledgement (NAK) if the subpacket is decoded in error. If the terminal sends a NAK, then the base station transmits the second subpacket (SP2). The terminal receives the transmission, decodes the first and second subpackets, and sends an ACK or a NAK based on the decoding result. The base station may thus transmit one subpacket at a time until an ACK is received for the packet, or all subpackets have been transmitted, or the packet transmission is terminated for some other reason.

The size of the subpackets is typically determined by, and matched to, the transmission capacity of the traffic channel. This allows each subpacket to be sent in its entire on the traffic channel. However, if supplemental resources can be dynamically assigned and used for traffic data, then the transmission capacity can vary from transmission to transmission. Packets may be efficiently sent using HARQ with variable transmission capacity as described below.

Figures 6A, 6B:
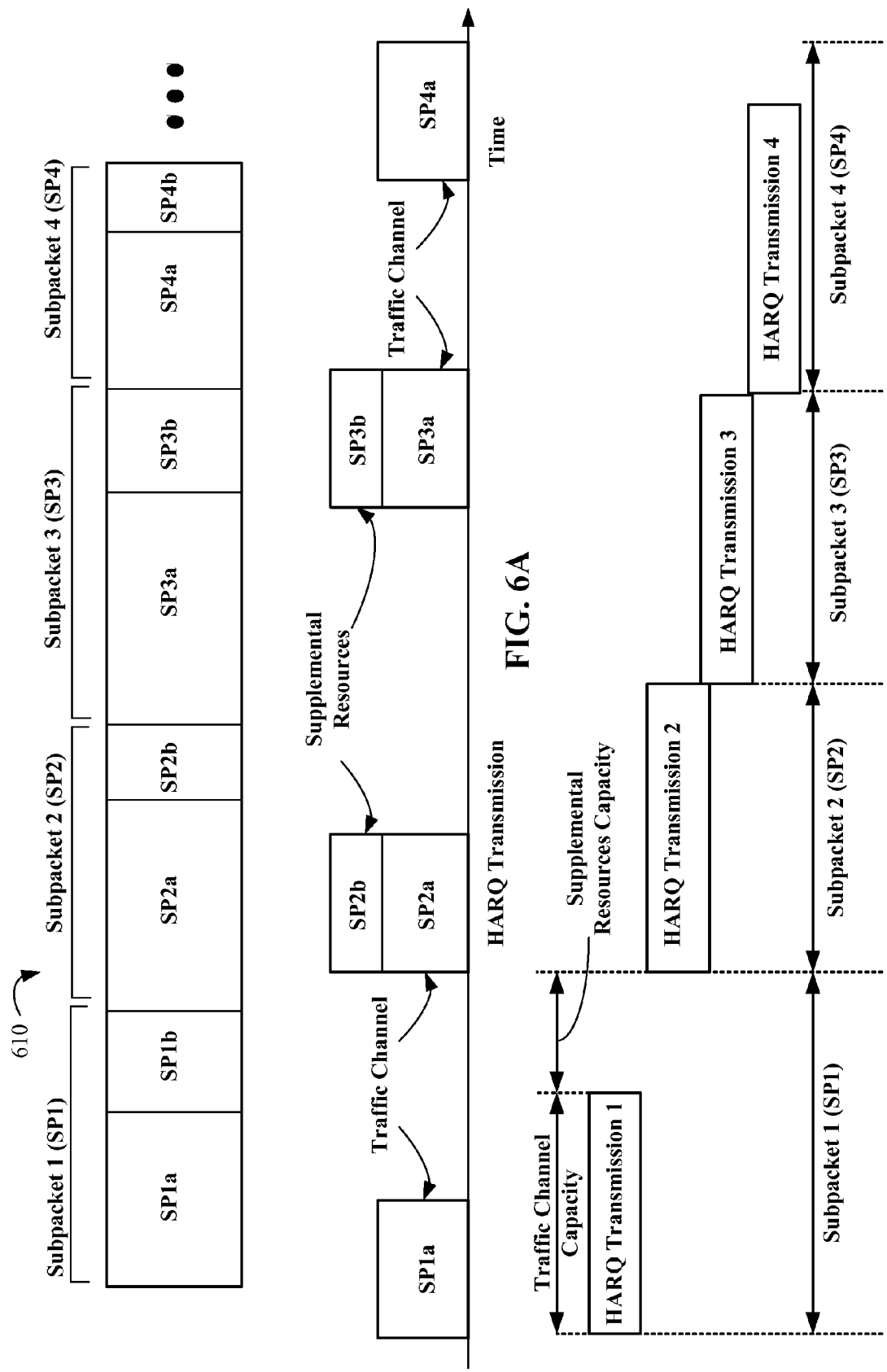
FIG. 6A shows a HARQ transmission scheme with dynamically assignable supplemental resources.
FIG. 6B shows a schematic diagram of four HARQ transmissions in accordance with an aspect.

FIG. 6A shows a HARQ transmission scheme 610 with dynamically assignable supplemental resources. A data packet is processed to generate S subpackets (only the first four subpackets 1 through 4 are shown in FIG. 6A for simplicity). Each subpacket n (SPn) includes a first coded portion (SPna) and a second coded portion (SPnb). In this scheme, the first coded portion (SPna) of a subpacket can be sent on the traffic channel, and the second coded portion (SPnb) of the subpacket can be sent on the supplemental resources (if available). The first coded portion is determined by the traffic channel capacity. The second coded portion is determined by the capacity of all supplemental resources that might be available.

The example scenario in FIG. 6A depicts the first four HARQ transmissions are shown. In this scenario, the supplemental resources are not available for the first and fourth HARQ transmissions and are available for the second and third HARQ transmissions. For the first HARQ transmission, the first coded portion (SP1a) of the first subpacket is sent on the traffic channel. The packet is decoded in error after the first HARQ transmission. For the second HARQ transmission, the first coded portion (SP2a) of the second subpacket is sent on the traffic channel, and all or part of the second coded portion (SP2b) of the second subpacket is sent on the supplemental resources. The packet is decoded in error after the first two HARQ transmissions. For the third HARQ transmission, the first coded portion (SP3a) of the third subpacket is sent on the traffic channel, and all or part of the second coded portion (SP3b) of the third subpacket is sent on the supplemental resources. The packet is decoded in error after the first three HARQ transmissions. For the fourth HARQ transmission, the first coded portion (SP4a) of the fourth subpacket is sent on the traffic channel.

FIG. 6B shows the coded data sent in the four HARQ transmissions. In this scheme, the second coded portion of a subpacket is not sent if the supplemental resources are not available. Although not shown in FIG. 6B, the second coded portion of a subpacket is not sent in its entirety if all of the supplemental resources are not available. This scheme may have a loss in coding gain due to (1) non-transmission of some coded data when supplemental resources are not available or (2) non-reception of the coded data sent on the supplemental resources, e.g., due to error in detecting the bitmap.

FIG. 7A shows an embodiment of an HARQ transmission scheme 710 with dynamically assignable supplemental resources. A data packet is processed to generate S subpackets, as described above for FIG. 6A. However, in this embodiment, an entire subpacket can be sent on the traffic channel, and all or part of the second coded portion (SPxb) of the subpacket can be sent on the supplemental resources from the unused portion of the associated reserved channel node(s).

FIG. 7A also shows the first four HARQ transmissions for the exemplary scenario described above for FIG. 6A. For the first HARQ transmission, the entire first subpacket (SP1) is sent on the traffic channel. The packet is decoded in error after the first HARQ transmission. For the second HARQ transmission, the entire second subpacket (SP2) is sent on the traffic channel, and a second coded portion (SP1b) of the first subpacket is sent on the supplemental resources. The packet is decoded in error after the first two HARQ transmissions. For the third HARQ transmission, the entire third subpacket (SP3) is sent on the traffic channel, and the second coded portion (SP2b) of the second subpacket is sent on the supplemental resources. The packet is decoded in error after the first three HARQ transmissions. For the fourth HARQ transmission, the entire fourth subpacket (SP4) is sent on the traffic channel. Thus, according to this transmission scheme, for each subpacket, the entire subpacket is sent on the traffic channel and a coded portion of that subpacket is sent on the supplemental channels in a subsequent transmission.

FIG. 7B shows the coded data sent in the four HARQ transmissions. In this embodiment, all of the coded data for each subpacket is sent on the traffic channel. A portion of the coded data may be repeated and sent on the supplemental resources if available. In this embodiment, in any given HARQ transmission other than the first HARQ transmission, the base station would populate the supplemental resources (if available) with some coded data sent in a previous HARQ transmission. For the first HARQ transmission, the base station would populate the supplemental resources (if available) with some coded data to be sent in the next HARQ transmission.

The embodiment in FIGS. 7A and 7B ensures coding efficiency for terminals that do not benefit from the supplemental resources and ensures that these terminals do not experience any loss in coding gain associated with the scheme described with respect to FIG. 6A, 6B. These terminals may not have benefited from the supplemental resources due to various reasons. For example, the supplemental resources may not be available on any HARQ transmission if all LABs are used to send control messages. As another example, traffic data may have been sent on the supplemental resources in some or all HARQ transmissions, but the terminals may have received the control channel assignment messages in error and may miss the traffic data sent on the supplemental resources. This embodiment ensures that the coded data for each transmitted subpacket can be received at least via the traffic channel.

FIG. 8A shows an embodiment of a HARQ transmission scheme 810 with dynamically assignable supplemental resources. A data packet is processed to generate S subpackets as described above for FIG. 6A. In this embodiment, an entire subpacket (SPn) can be sent on the traffic channel, and all or part of the coded portion (SP(n+1)x) of a next subpacket can be sent on the supplemental resources.

FIG. 8A also shows the first four HARQ transmissions for the scenario described above for FIG. 6A. For the first HARQ transmission, the entire first subpacket (SP1) is sent on the traffic channel. The packet is decoded in error after the first HARQ transmission. For the second HARQ transmission, the entire second subpacket (SP2) is sent on the traffic channel, and a coded portion (SP3$x$) of the next subpacket (SP3) is sent on the supplemental resources. The packet is decoded in error after the first two HARQ transmissions. For the third HARQ transmission, the entire third subpacket (SP3) is sent on the traffic channel, and a coded portion (SP4$x$) of the next subpacket is sent on the supplemental resources. The packet is decoded in error after the first three HARQ transmissions. For the fourth HARQ transmission, the entire fourth subpacket (SP4) is sent on the traffic channel. Thus, according to this transmission scheme, for each subpacket, the entire subpacket is sent on the traffic channel and a coded portion of the next subpacket is simultaneously transmitted on the supplemental channels.

FIG. 8B shows the coded data sent in the four HARQ transmissions. In this embodiment, all of the coded data for each subpacket is sent on the traffic channel. A portion of the coded data from a subpacket may be repeated and sent on the supplemental resources if available prior to transmission of the subpacket through the traffic channel. In this embodiment, in any given HARQ transmission, the base station would populate the supplemental resources (if available) with some coded data for a future HARQ transmission.

In the embodiments shown in FIGS. 7A through 8B, coded data for a subpacket may be repeated and sent on the supplemental resources, if available, in either the prior or next HARQ transmission.

In general, coded data can be sent on the supplemental resources, if available, in a manner to delay data repetition. A data packet may contain P information bits and may be encoded into Q coded bits with a code rate of P/Q (e.g., a code rate of $\frac{1}{5}$). S subpackets are then generated from the Q coded bits. To fill the subpackets, the Q coded bits can be taken from a buffer in a circular fashion so that once the Q-th coded bit is used, the first coded bit is taken next as follows:

1, 2, 3, . . . , Q−2, Q−1, Q, 1, 2, 3, . . . , Q−2, Q−1, Q, . . .

Depending on the number of subpackets (S) and the subpacket size, a given coded bit may be used in zero, one, or multiple subpackets. The coded data for the supplemental resources can also be taken in a reverse circular order, as follows:

Q, Q−1, Q−2, . . . , 3, 2, 1, Q, Q−1, Q−2, . . . , 3, 2, 1 . . .

The number of coded bits to take from the buffer in the reverse direction for each HARQ transmission is determined by the capacity of the supplemental resources, which may vary from transmission to transmission.

FIG. 9A also shows the first four HARQ transmissions for the exemplary scenario described above for FIG. 6A. For the first HARQ transmission, the entire first subpacket (SP1) is sent on the traffic channel. The packet is decoded in error after the first HARQ transmission. For the second HARQ transmission, the entire second subpacket (SP2) is sent on the traffic channel, and a coded portion (SPSa) of the last subpacket is sent on the supplemental resources. The packet is decoded in error after the first two HARQ transmissions. For the third HARQ transmission, the entire third subpacket (SP3) is sent on the traffic channel, and a coded portion (SPSb) of the last subpacket is sent on the supplemental resources. The packet is decoded in error after the first three HARQ transmissions. For the fourth HARQ transmission, the entire fourth subpacket (SP4) is sent on the traffic channel. Thus, according to this transmission scheme, for each subpacket, the entire subpacket is sent on the traffic channel and a coded portion of the last subpacket is transmitted on the supplemental channels.

FIG. 9B shows the coded data sent in the four HARQ transmissions. In this embodiment, all of the coded data for each subpacket is sent on the traffic channel. Additional (possibly new) coded data may be sent on the supplemental resources if available. In this embodiment, in any given HARQ transmission, the base station would populate the supplemental resources (if available) with some coded data that might not have been sent before. In general, traffic data may be sent on the traffic channel and the supplemental resources in a manner to achieve the following goals:

1. Avoid wasting coded bits for a terminal that does not benefit from the supplemental resources and to not start repeating code bits for the traffic channel until all coded bits have been used, and
2. Reduce the amount of repetition of coded bits caused by the presence of supplemental resources.
3. To enable an AT that does not support the supplemental resources or that fails to decode a message assigning resources (erasure event), to process data received on non-supplemental resources.

All the embodiments discussed supra meet goal 3. The embodiments in FIGS. 5A through 9B achieve goal 1. The embodiments in FIGS. 7A through 8B use repetition on the supplemental resources, if available, starting from the second HARQ transmission. The embodiment in FIGS. 9A and 9B delays repetition in the presence of supplemental resources for as long as possible.

In this embodiment, a terminal that benefits from the supplemental resources does not see any repetition until all of the coded bits are used. The Q coded bits generated for a data packet may have equal value in terms of error correction capability or may have different values, depending on the structure of the code used to generate the coded bits. If the Q coded bits have equal value, then the embodiment shown in FIGS. 9A and 9B may provide better performance than the embodiments shown in FIGS. 7A through 8B. If the Q coded bits have different values (e.g., for a rate ⅕ code that contains an embedded rate ⅓ code), then the coded bits for the supplemental resources may be selected by considering various factors such as the relative values of the coded bit, the potentially poorer coding gain due to repetition, and so on.

The embodiments in FIGS. 7A through 9B provide a good comprise in terms of performance for terminals that benefit from the supplemental resources as well as terminals that do not benefit from the supplemental resources. In an embodiment, the coded data sent on the traffic channel is modulated (symbol mapped) with a first modulation scheme selected for the traffic channel. The coded data sent on the supplemental resources is modulated with a second modulation scheme selected for the control channel. The first modulation scheme may be the same as, or different from, the second modulation scheme. In this embodiment, traffic data sent on the supplemental resources is modulated with the same modulation scheme as the control messages, regardless of the modulation scheme used on the associated traffic channel.

In another embodiment, traffic data is sent using the same modulation scheme for both the traffic channel and the supplemental resources. In general, the same or different coding schemes and the same or different modulation schemes may be used for traffic data sent on the traffic channel and traffic data sent on the supplemental resources.

Figure 10:
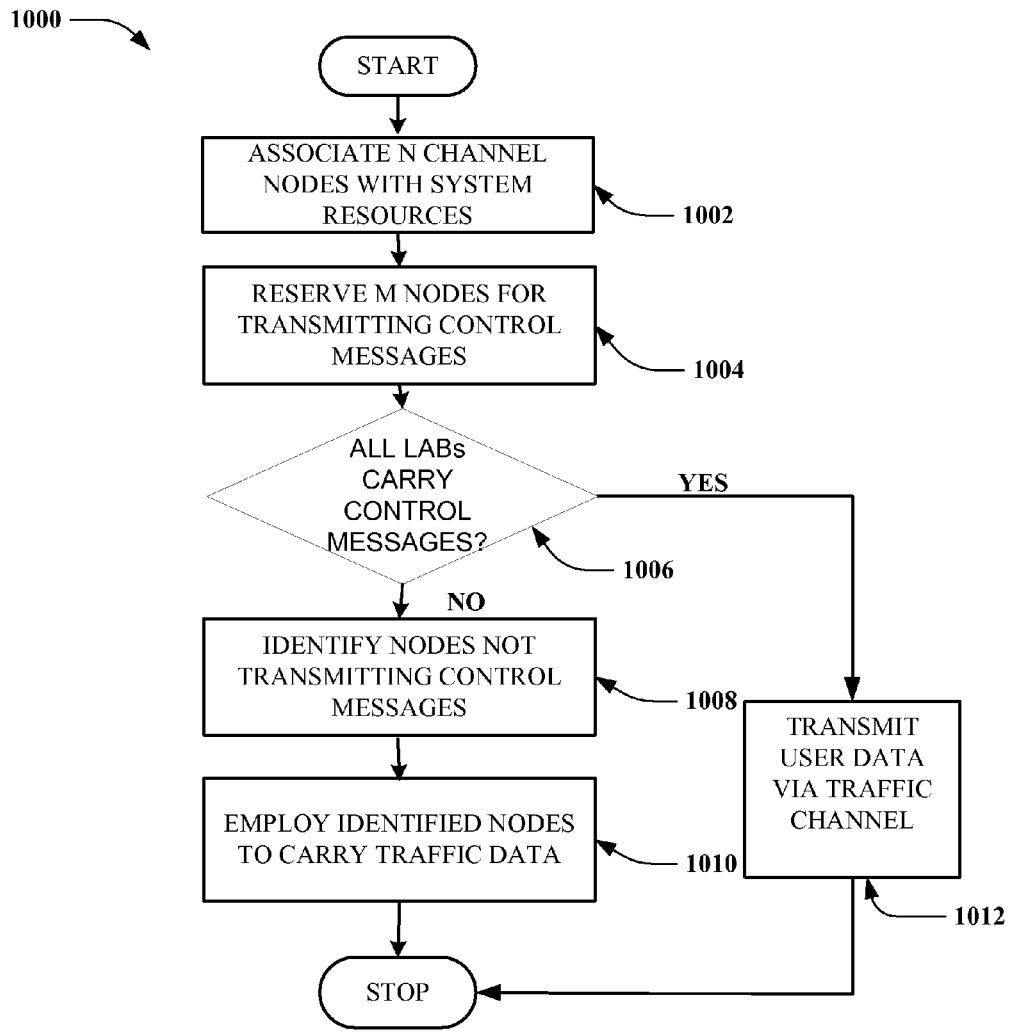
FIG. 10 is an embodiment illustrating a method of assigning supplemental resources within a communication network.

FIG. 10 is an embodiment illustrating a method 1000 of assigning supplemental resources within a communication network. The method begins at 1002 wherein N channel nodes are associated with system resources by mapping them to N different tiles. At 1004, of the N channel nodes M nodes are reserved for transmitting control messages such that M<N. The remaining N-M channels may be assigned to carrying traffic data. In other embodiments, all the N channels can be transmitting control messages, in which case, there would be no traffic channels. At 1006, it is determined if all L link association blocks (LABs) associated with the M channel nodes are carrying control messages. If all the L LABs are involved in communicating control messages, then it is determined that no supplemental resources are available, user traffic is sent on traffic channels as seen at 1012. If it is determined that of the N channel nodes there are those channel nodes (M+1,... N) which are not involved in carrying control messages, then such channels are identified at 1008. At 1010, the identified channel nodes are then assigned as supplemental resources to carry traffic data. In an embodiment (not shown) it may be determined if the service options of the user permit assignment of the supplemental resources before allocation of the resources.

Figure 11:
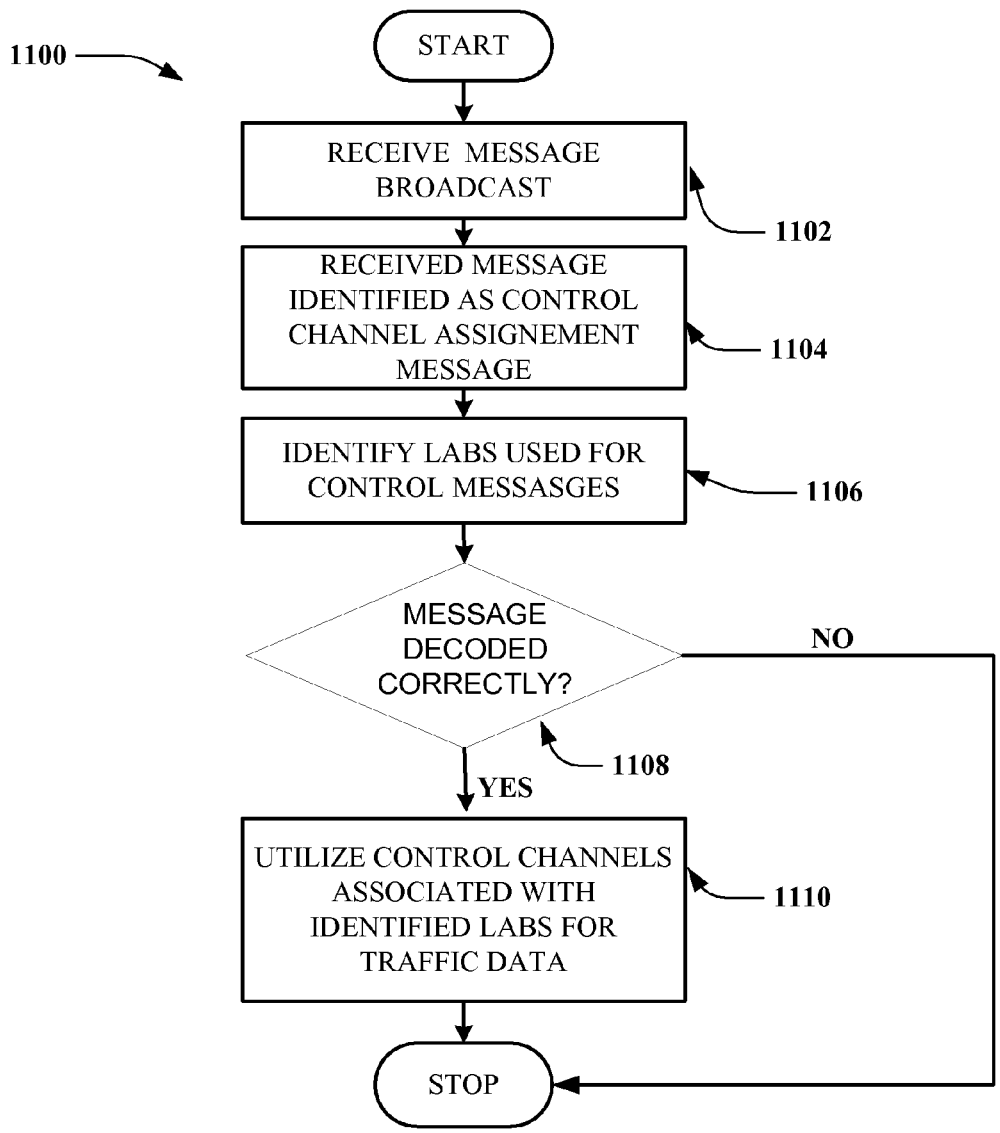
FIG. 11 is embodiment illustrating a method for determining which if any supplementary resources have been assigned to carry traffic data.

FIG. 11 is embodiment illustrating a method for determining which if any supplementary resources have been assigned to carry traffic data. At 1102, the terminal receives a message broadcast by a base station. The message can comprise a message type field, a bitmap and a cyclic redundancy check (CRC) field. The received message is identified as a control channel assignment message by examining the message type field at 1104. At 1106, the bitmap field is examined to identify which LABs are used for transmitting control messages and which LABs are not used for transmitting control messages. At 1108, the CRC field is employed to confirm that the message has been decoded correctly. At 1110, the control channels not involved in transmitting control messages are utilized as supplemental resources to transport data traffic.

Figure 12:
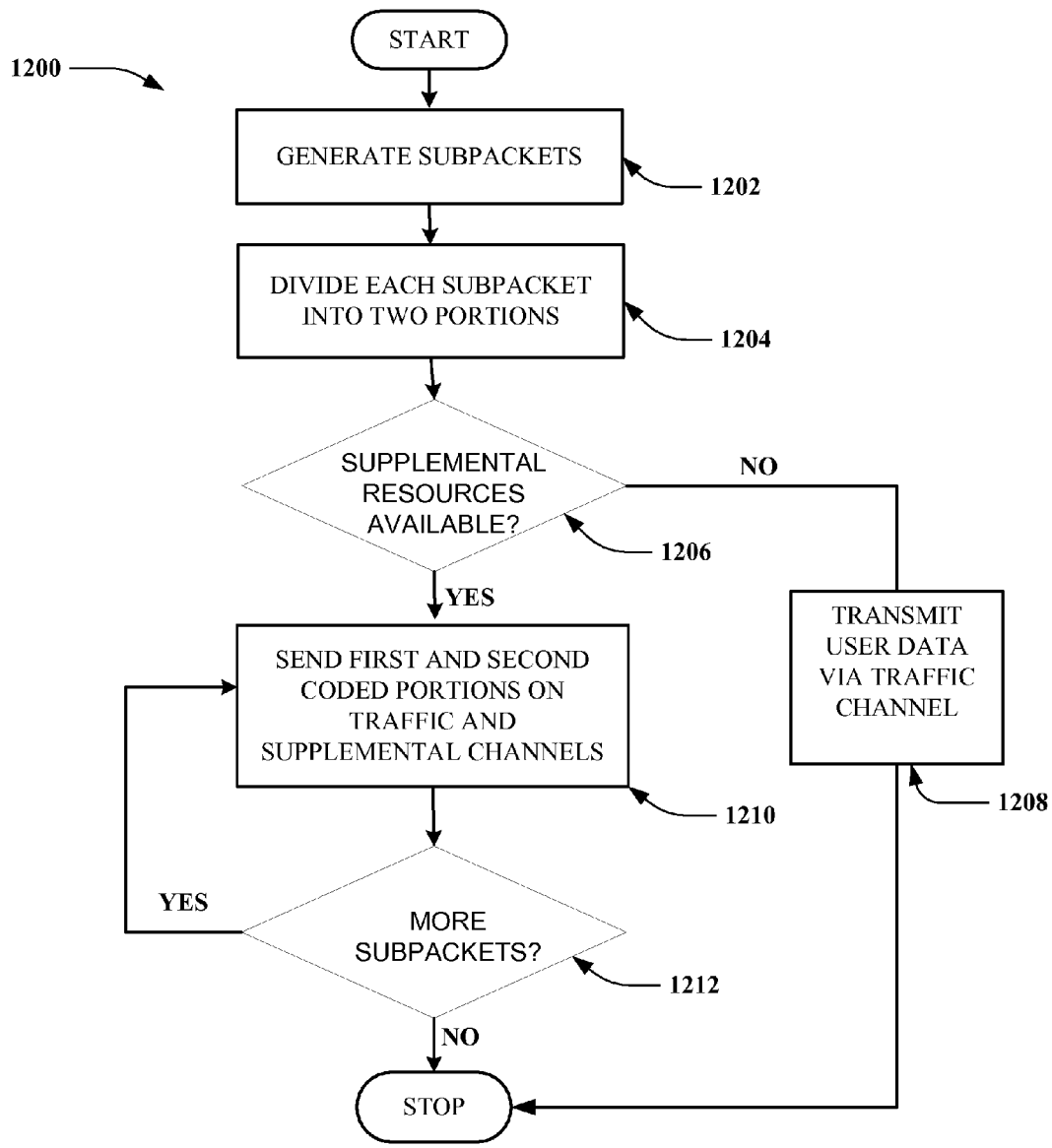
FIG. 12 illustrates a scheme to transport data packets by utilizing both the traffic channels as well as the supplemental resource.

Upon identifying channels that can be used as supplemental resources to transport data traffic, various schemes may be employed to transport data packets via the dedicated traffic channels as well as the supplemental resource channels as detailed below. FIG. 12 illustrates one such scheme to transport data packets by utilizing both the traffic channels as well as the supplemental resource. At 1202, the data packets are processed to generate sub packets. At 1204, each subpacket is divided into a first coded portion and a second coded portion. At 1206, a determination is made if the supplemental resources are available. If the resources are not available, the data packets are entirely transmitted via the traffic channel at 1208. If they are available, the first coded portion is transported on the traffic channel while the second coded portion is transported on the supplemental channels obtained from the reserved control channels at 1210. At 1212, it is determined if there are more packets to be transmitted. The process is thus repeated for all the data packets. As stated supra, this scheme may have a loss in coding gain due to (1) non-transmission of some coded data when supplemental resources are not available or (2) non-reception of the coded data sent on the supplemental resources, e.g., due to error in detecting the bitmap.

Figure 13:
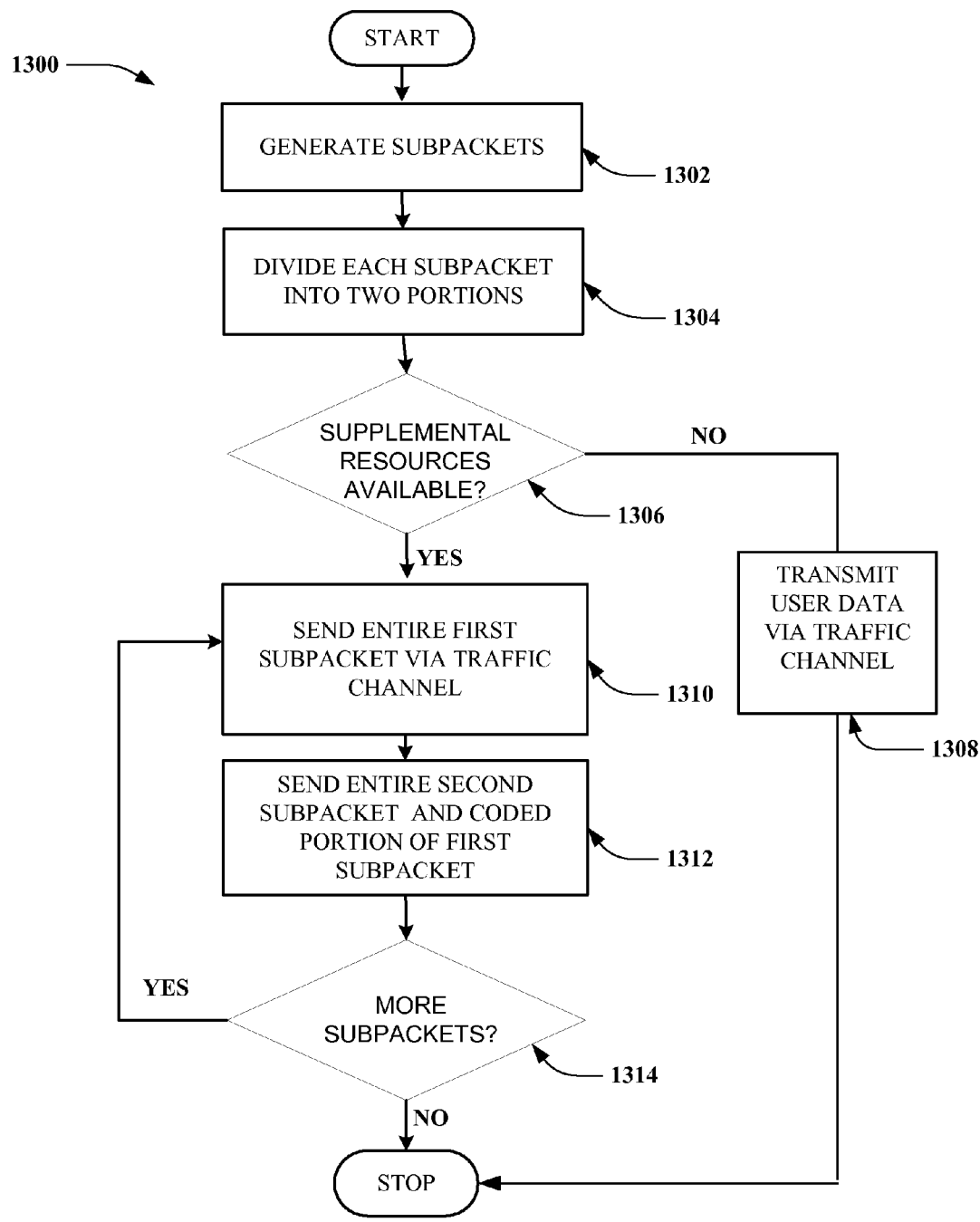
FIG. 13 illustrates another methodology of data packet transmission that can be employed when supplemental resources are available.

FIG. 13 illustrates another methodology of data packet transmission that can be employed when supplemental resources are available. At 1302, the data packets are processed to generate sub packets. At 1304, each subpacket is divided into a first coded portion and a second coded portion. At 1306, a determination is made if the supplemental resources are available. If the resources are not available, the data packets are entirely transmitted via the traffic channel at 1308. If they are available, a first HARQ transmission transports the entire first subpacket via a traffic channel at 1310. For the second transmission at 1312, the entire second subpacket is sent on the traffic channel while a coded portion of the first subpacket is repeated and transmitted via the available supplemental resources. At 1314, it is determined if there are more packets to be transmitted. The process is thus repeated for all the subpackets. Hence, this methodology relates to a transmission scheme wherein an entire subpacket is transmitted via a traffic channel and a coded portion of the subpacket is repeated and transmitted via available supplemental resources during a subsequent transmission.

Figure 14:
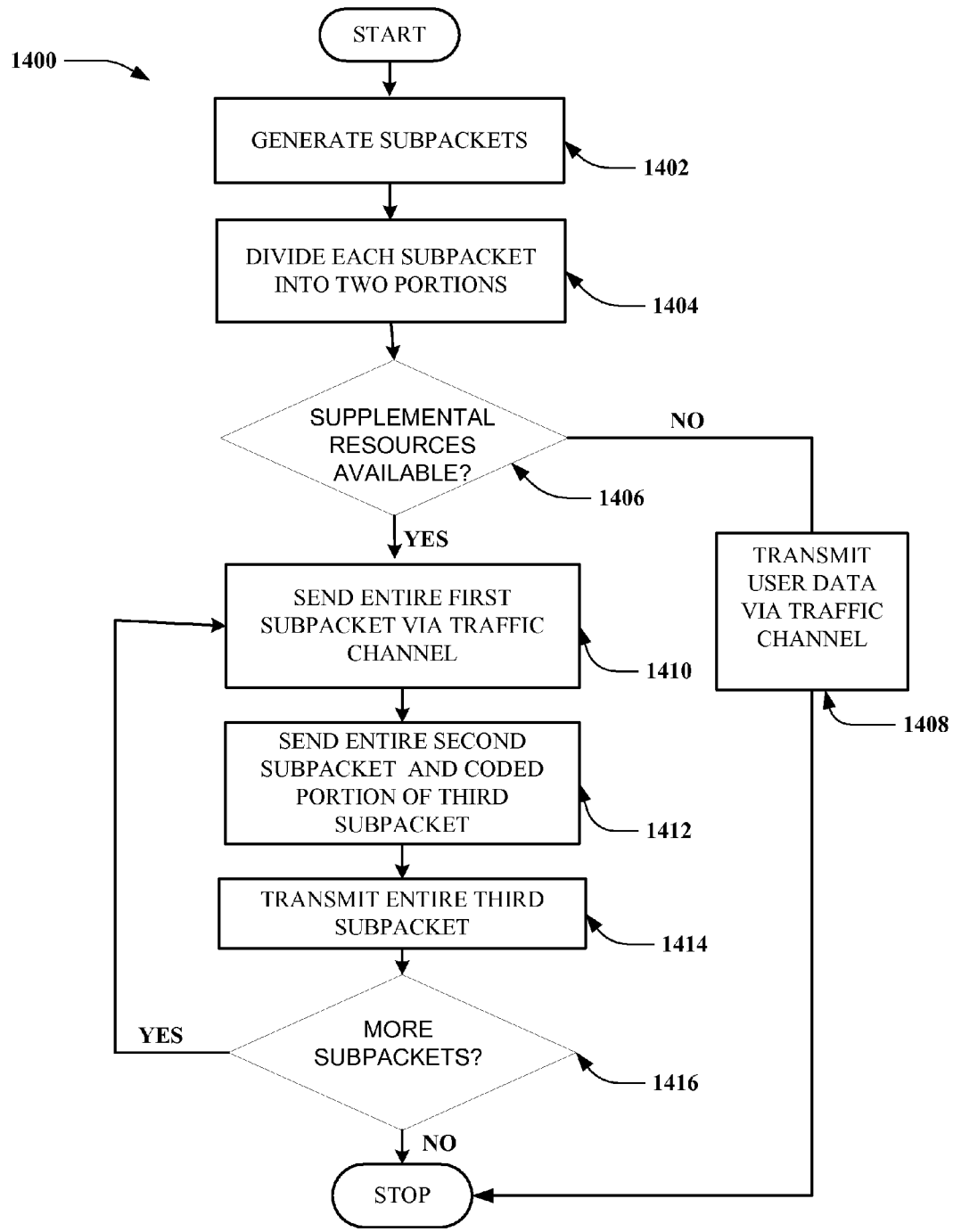
FIG. 14 illustrates yet another methodology of data packet transmission that can be employed when supplemental resources are available.

FIG. 14 illustrates another methodology of data packet transmission that can be employed when supplemental resources are available. At 1402, the data packets are processed to generate sub packets. At 1404, each subpacket is divided into a first coded portion and a second coded portion. At 1406, a determination is made if the supplemental resources are available. If the resources are not available, the data packets are entirely transmitted via the traffic channel at 1408. If they are available, a first HARQ transmission transports the entire first subpacket via a traffic channel at 1410. For the second transmission at 1412, the entire second subpacket is sent on the traffic channel while a coded portion of a third subpacket is transmitted via the available supplemental resources. At 1414, the entire third subpacket is repeated and transmitted via the traffic channel. At 1416, it is determined if there are more subpackets to be transmitted. The process is thus repeated for all the data packets. Hence, this methodology relates to a transmission scheme wherein an entire subpacket is transmitted via a traffic channel and while a coded portion of the subpacket was repeated and transmitted via available supplemental resources during a prior transmission.

Figure 15:
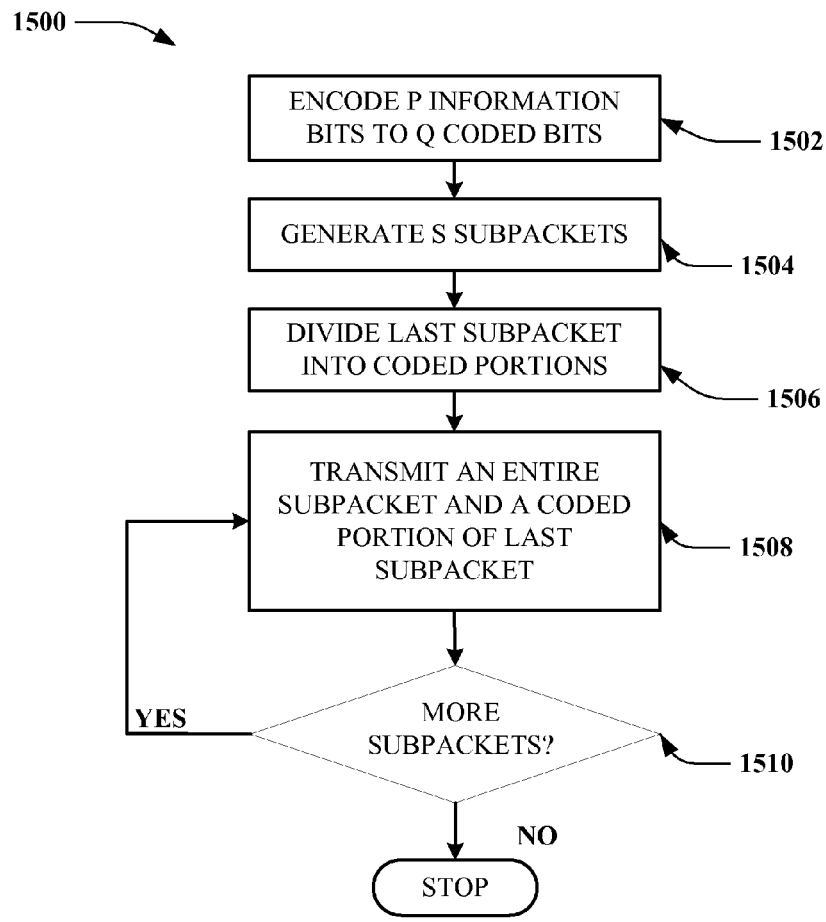
FIG. 15 is a flow chart illustrating an embodiment of a method which may minimize repetition caused by presence of supplemental resources.

While the methodologies illustrated in FIG. 13 and FIG. 14 avoid wasting coded bits for terminals that do not benefit from supplemental resources by not starting repetition until all coded bits are used, they do not minimize repetition caused by presence of supplemental resources. This can be achieved by adopting a schema illustrated in FIG. 15. Here, methodology of data packet transmission is shown wherein data packets are transmitted in a manner so that the amount of repetition of coded bits caused by the presence of supplemental resources is minimized. Hence, in accordance with the scheme illustrated in FIG. 15, a terminal that benefits from supplemental resources does not see any repetition until all the coded bits are used.

Initially at 1502, P information bits that are to be transmitted are encoded into Q coded bits with a code rate of P/Q. At 1504, S subpackets are generated by filling them with the Q coded bits taken from a buffer in a circular manner so that once the Q-th coded bit is used, the first coded bit is taken up next. At 1506, the last subpacket, subpacket S, is divided into a number of coded portions. The size of the coded portions can be varied dynamically based on a number of factors. For example, the capacity of available supplemental resources can be dynamically determined and the last subpacket can be divided accordingly. Assuming the presence of supplemental resources, at 1508, a subpacket is transmitted in its entirety on the traffic channel while a coded portion of the last subpacket is transmitted on the supplemental resources. For example, during a first HARQ transmission, a first subpacket is transmitted in its entirety via a traffic channel while a first coded portion of the last (S) subpacket is transmitted via the available supplemental resources. This process is repeated at 1510 for all the (S-1) subpackets so that an entire subpacket is transmitted on a traffic channel while a coded portion of the last subpacket is transmitted on the supplemental resources. Hence, this process minimizes repetition of coded bits as ideally all the coded bits in all the subpackets are transmitted/read only once.

Figure 16:
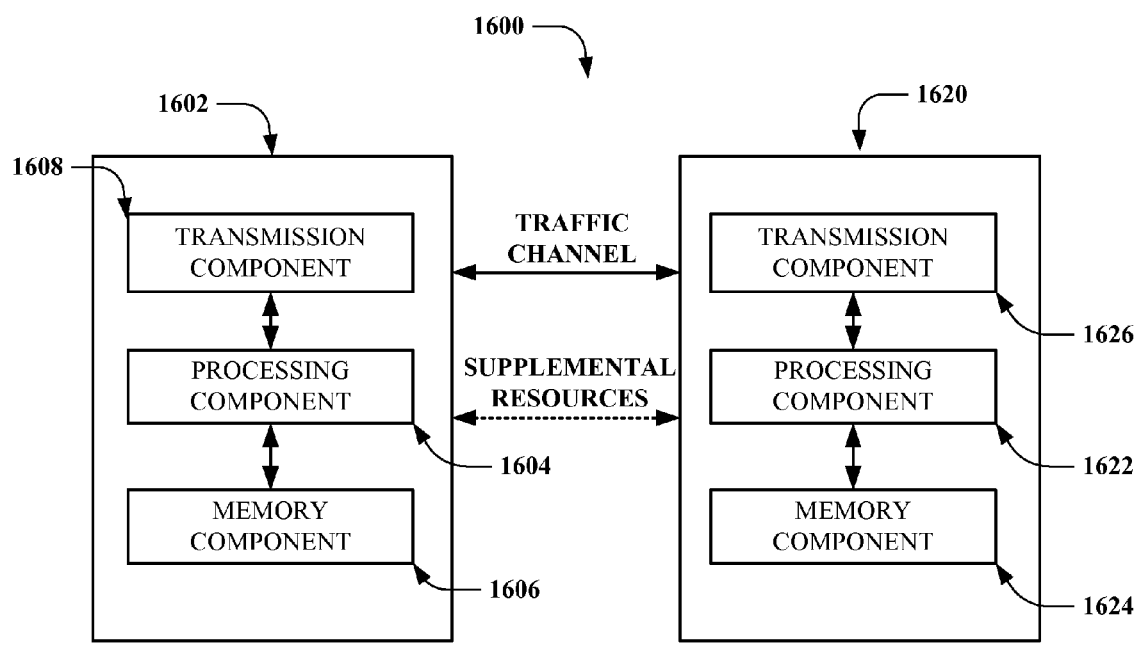
FIG. 16 is a block diagram depicting an embodiment of a communication system which may minimize data repetition in presence of supplemental resources.

FIG. 16 illustrates a schematic block diagram of a communication system 1600 that minimizes data repetition in presence of supplemental resources in accordance with an aspect. The system comprises a first communication component 1602 and a second communication component 1620 which are configured to transmit/receive data in accordance with various schemes detailed supra.

The first communication component 1602 further comprises a processing component 1604 that processes traffic data into subpackets based on one or more of available power within the system, traffic channel capacity etc. It further comprises a memory component 1606 operatively coupled to the processing component that buffers code bits and facilitates generation of subpackets by filling them with the code bits. In accordance with various schemes detailed above, the subpackets can be filled sequentially, or in a circular manner etc. A transmission component 1608 is also included within the first communication component such that the transmission component transmits the data packets/subpackets based on various transmission schemes as determined by the processing component 1604. In accordance with an aspect, the processing component 1604 can assign reserved control channels not engaged in carrying control messages to traffic channels as supplemental resources for carrying traffic data. Hence, the transmission component is configured to transmit one or more of data packets, subpackets, coded portions of subpackets or a combination thereof on various frequencies according to various schemes.

The communication system 1600 also comprises a second communication component 1620 which can receive the subpackets transmitted by the first communication component. The second communication component can also comprise a processing component 1622, a memory component 1624 as well as a transmission component 1626. The second communication component 1620 can demodulate received data packets based on a channel assignment message broadcast by the first component 1602. The channel assignment message also facilitates determining if the received data packets/subpackets have been correctly decoded. If they are correctly decoded then the second communication component generates an acknowledgment (ACK) message else it generates a negative acknowledgment (NAK) message. Based on the type of acknowledgment message received, the first component 1602 can transmit the subpackets one at a time until an ACK message is receive for a data packet, or all subpackets are transmitted or the communication session is terminated for other reasons.

The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

The techniques described herein generally relating to data selection for supplemental resources involve various RL channels including data and control channels. In an embodiment, the techniques may be used for reverse link RL control channels such as Channel Quality Indicator Channel (CQICH), a Request Channel (REQCH), a Pilot Channel (PICH), an Acknowledgement Channel (ACKCH), a Beamforming Feedback Channel (BFCH), a Subband Feedback Channel (SFCH), and so on, which may be processed and transmitted. The techniques can also be used for a time division multiplexed (TDM) pilot that is spread with a channelization code and scrambled.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A communication system for minimizing repetition, said communication system comprising:
    a processing component that processes a data packet into a plurality of subpackets filled with coded bits wherein a last subpacket of the plurality of subpackets is further divided into coded portions; and
    a transmission component that transmits an entire subpacket from the plurality of subpackets on a traffic channel, modulating the subpacket transmitted on the traffic channel in accordance with a first modulation scheme selected for the traffic channel, the transmission component transmits the coded portions of the last subpacket on assigned supplemental resources of one or more control channels, modulating the coded portions transmitted on the assigned supplemental resources with a second modulation scheme selected for the one or more control channels associated with the assigned supplemental resources, wherein the assigned supplemental resources are link assignment blocks mapped to the one or more control channels that are not engaged in transmitting control messages.

2. The system of claim 1, further comprising a memory component operative coupled to the processing component that buffers the coded bits so that the subpackets are filled in a circular fashion.

3. The system of claim 1, the processing component allocates the supplemental resources from one or more control channels not utilized in transporting control messages.

4. The system of claim 1, the processing component identifies link assignment blocks not carrying control messages to determine the unutilized control channels.

5. The system of claim 1, wherein the processing component processes data packets associated with user generated messages comprising one or more of data messages, voice messages or video messages.

6. The system of claim 1, further comprising a mobile terminal generates an acknowledgement (ACK) message if subpacket is received and decoded correctly.

7. The system of claim 1, further comprising a mobile terminal generates a negative acknowledgment (NAK) if the transmitted subpacket is received and decoded incorrectly.

8. A method for minimizing repletion in communication system, the method comprising:
    generating a plurality of subpackets from a data packet;
    dividing a last subpacket of the plurality of subpackets into coded portions;
    transmitting an entire subpacket from the plurality of subpackets on a traffic channel, modulating the subpacket transmitted on the traffic channel in accordance with a first modulation scheme selected for the traffic channel; and
    transmitting the coded portions on assigned supplemental resources of a control channel, modulating the coded portions transmitted on the assigned supplemental resources with a second modulation scheme selected for the control channel, wherein the assigned supplemental resources are link assigned blocks mapped to the control channel that are not engaged in transmitting control messages.

9. The method of claim 8, further comprising determining a size of the subpackets based on a transmission capacity of the traffic channel.

10. The method of claim 8, further comprising varying size of the coded portions dynamically based on capacity of the assigned supplemental resources.

11. The method of claim 8, further comprising determining the link assignment blocks not transmitting control messages based on information conveyed via an assignment message.

12. The method of claim 8, further comprising generating an acknowledgement (ACK) when the transmitted subpacket is received and correctly decoded.

13. The method of claim 8, further comprising generating a negative acknowledgement (NAK) when the transmitted subpacket is received and incorrectly decoded.

14. A communication system for minimizing data repetition, said communications system comprising:
    means for generating a plurality of subpackets from a data packet, and for dividing a last subpacket of the plurality of subpackets into coded portions;
    means for transmitting an entire subpacket from the plurality of subpackets on a traffic channel, modulating the subpacket transmitted on the traffic channel in accordance with the first modulation scheme selected for the traffic channel, and for transmitting the coded portions on assigned supplemental resources of a control channel, modulating the coded portions transmitted on the assigned supplemental resources with a second modulation scheme selected for the control channel, wherein the assigned supplemental resources are link assignment blocks mapped to the control channel that are not engaged in transmitting control messages.

15. The communication system of claim 14, further comprising means for decoding the received subpackets.

16. The system of claim 15, further comprising means for generating one of an acknowledgment (ACK) or a negative acknowledgment (NAK) message based on decoding results of the subpackets.

17. A non-transitory computer readable medium having stored thereon computer-executable instructions that when executed by a processor performs:
    generating a plurality of subpackets from a data packet;
    dividing a last subpacket of the plurality of subpackets into coded portions;
    transmitting an entire subpacket from the plurality of subpackets on a traffic channel, modulating the subpacket transmitted on the traffic channel in accordance with a first modulation scheme selected for the traffic channel; and transmitting the coded portions on assigned supplemental resources of a control channel, modulating the coded portions transmitted on the assigned supplemental resources with a second modulation scheme selected for the control channel, wherein the assigned supplemental resources are link assignment blocks mapped to the control channel that are not engaged in transmitting control messages.

18. The non-transitory computer readable medium of claim 17, further comprising instructions for determining a size of the subpackets based on a transmission capacity of the traffic channel.

19. The non-transitory computer readable medium of claim 17, further comprising instructions for varying a size of the subpackets based on a capacity of the assigned supplementary resources.

20. The non-transitory computer readable medium of claim 17, further comprising instructions for determining the link assignment blocks not engaged in transmitting the control messages based on information conveyed via an assignment message.

* * * * *